United States Patent
Urey et al.

(10) Patent No.: US 7,489,433 B2
(45) Date of Patent: Feb. 10, 2009

(54) METHOD AND APPARATUS FOR MAKING AND USING 1D AND 2D MAGNETIC ACTUATORS

(75) Inventors: Hakan Urey, Istanbul (TR); Olgac Ergeneman, Ankara (TR)

(73) Assignee: Microvision, Inc., Redmond, WA (US)

( * ) Notice: Subject to any disclaimer, the term of this patent is extended or adjusted under 35 U.S.C. 154(b) by 0 days.

(21) Appl. No.: 11/704,695

(22) Filed: Feb. 9, 2007

(65) Prior Publication Data

US 2007/0257565 A1 Nov. 8, 2007

Related U.S. Application Data

(60) Provisional application No. 60/771,586, filed on Feb. 9, 2006.

(51) Int. Cl.
*G02F 1/09* (2006.01)
(52) U.S. Cl. ..................... 359/280; 359/238
(58) Field of Classification Search ............... 359/280, 359/238
See application file for complete search history.

(56) References Cited

U.S. PATENT DOCUMENTS

2002/0050744 A1* 5/2002 Bernstein et al. ............. 310/12
2004/0075522 A1* 4/2004 Kato et al. .................. 336/200

OTHER PUBLICATIONS

Hakan Urey, "Retinal Scanning Displays", Encyc. of Optical Engineering, 2003, pp. 2445-2257, Marcel Dekker, Inc., New York, United States.

Hakan Urey, "MEMS Scanners for Display and Imaging Applications", submitted to Photonics East, 2004, pp. 1-9.

Hakan Urey et al., "Scanner design and resolution tradeoffs for miniature scanning displays", SPIE Proc. of Conference on Flat Display Technology and DIsplay Metrology, 1999, pp. 60-68, vol. 3636, San Jose, United States.

Hakan Urey et al., "MEMS Rastor Correction Scanner for SXGA resolution Retinal Scanning Display", Proceedings of SPIE Proc. of MOEMS Display and Imaging System II, SPIE, 2003, pp. 106-114, vol. 4985.

Alexander Wolter et al., "MEMS microscanning mirror for barcode reading: from development to production", SPIE Proc. of MOEMS Display and Imaging Systems II, 2004, pp. 32-39, vol. 5348, SPIE, Bellingham, WA United States.

Harold Schenk et al., "Light processing with electrostatically driven micro scanning mirrors and micro mirros arrays", SPIE Proc. of MOEMS Display and Imaging Systems II, 2004.

Kai-Uwe Roscher et al., "Low cost projectition device with a 2D resonant microscanning mirror", SPIE Proc. of MOEMS Display and Imaging Systems II, 2004, pp. 22-31, vol. 5348, SPIE, Bellingham, WA United States.

Robert A. Conant et al., "A raster-scanning full-motion video display using polysilicon micromachined mirrors", Proc. of the 1999 Int. Conf. on Solid-State Sensors and Actuators (Transducer '99), 1999, pp. 376-379, Elsevier Science S.A., Sendai, Japan.

(Continued)

*Primary Examiner*—Jessica T Stultz
*Assistant Examiner*—Mahidere S Sahle
(74) *Attorney, Agent, or Firm*—Kevin D. Wills

(57) ABSTRACT

A light beam scanner may include a polymeric material and a soft magnetic material.

3 Claims, 17 Drawing Sheets

OTHER PUBLICATIONS

Jin-Ho Lee et al., "Design and fabrication of scanning mirror for laser display", Sensors and Actuators A, 2002, pp. 223-230, vol. 96, Elsevier Science B.V.

David L. Dickensheets et al., "Silicon-micromachined scanning confocal optical microscope", Journal of Microelectromechanical Systems, 1998, pp. 38-47, vol. 7, IEEE.

Caglar Ataman, "Design, Modeling and Characterization of Electrostatically Actuated Microscanners", M.S. Thesis, 2004, pp. 1-93.

Hung-Yi Lin et al., "A Rib-reinforced micro torsional mirror driven by electrostatic torque generators", Sensors and Actuators A, 2003, pp. 1-9, vol. 105, Elsevier Science B.V., Taiwan.

Thomas G. Bifano et al., "Microelectromechanical Deformable Mirrors", IEEE Journal of Selected Topics in Quantum Electronics, 1999, pp. 83-89, vol. 5 No. 1.

Sunghoon Kwon et al., "A High Aspect Ratio 2D Gimbaled Microscanner with Large Static Rotation", IEEE/LEOS Optical MEMS, 2002, pp. 149-150.

Daesung Lee et al., "Single-crystalline silicon micromirrors actuated by self-aligned vertical electrostatic combdrives with piston-motion and rotation capability", Sensors and Actuatrors A (to be published), 2003.

Jack William Judy, "Batch-fabricated Ferromagnetic Microactuators with Silicon Flexures", PhD Thesis, 1996.

Jonathon J. Bernstein et al., "Electromagnetically actuated mirror arrays for use in 3-D optical switching applications", Journal of Microelectromechanical Systems, 2004, pp. 526-535,vol. 13, No. 3.

B. Wagner et al., "Microfabricated actuator with moving permanent magnet", IEEE, 1991, pp. 27-32.

Hyoung J. Cho et al., "A Bi-directional magnetic microactuator using electroplated permanent magnet arrays", Journal of Microelectromechanical Systems, 2002, pp. 78-84, vol. 11, No. 1.

Jack William Judy et al., "Magnetic microactuation of Polysilicon Flexure Structures", Journal of Microelectromechanical Systems, 1995, pp. 162-169, vol. 4, No. 4.

Chang Liu, "Micromachined Magnetic Actuators Using Electroplated Permalloy", IEEE Transactions on Magnetics, 1999, pp. 1976-1985, vol. 35, No. 3.

Chang Liu et al., "Out-of-plane magnetic actuators with electroplated permalloy for fluid dynamics control", Sensors and Actuators, 1999, pp. 190-197, vol. 78.

S. Schweizer et al., "Thermally actuated optical microscanner with large angle and low consumption", Sensors and Actuators, 1999, pp. 470-477, vol. 76.

Minoru Sasaki et al., "Optical scanner on a three-dimensional microoptical bench", Journal of Lightwave Technology, 2003, pp. 602-608, vol. 21, No. 3, IEEE, Japan.

Wen-Mei Lin et al., "Two-dimensional microscanner actuated by PZT thin film", SPIE Proc. Of Device and Process Technologies for MEMS and Microelectronics, 1999, pp. 133-140, vol. 3892, Australia.

F. Filhol et al, "Piezoelectric micromirrors for fast optical scanning with large angular deflection", IEEE/LEOS International Conference on Optical MEMS and Their Applications, 2004, Japan.

Harold Schnek et al, "Large deflection micromechanical scanning mirrors for linear scans and pattern generation", Journal of Selected Topics in Quantum Electronics, 2000, pp. 715-722, vol. 6, No. 5.

Hakan Urey et al, "Vibration mode frequency of formulae for micromechanical scanners", Journal of Micromechanics and Microengineering, 2005, pp. 1713-1721, vol. 15, IOP Publishing LTD, United Kingdom.

Karl Vollmers et al, "High Strength Rare Earth-Iron-Boron Printed Magnets Used In A Long Throw-High Force Electromagnetic Actuator With Microfabricated Coils", Proc. IEEE MEMS, 2003, pp. 60-63, IEEE, Japan.

Laure K. Lagorce et al, "Magnetic and Mechanical Properties of Micromachined Strontium Ferrite/Polyimide Composites", Journal of Microelectromechanical Systems, 1997, pp. 307-312, vol. 6, No. 4, IEEE, United States.

Laure K. Lagorce et al, "Magnetic Microactuators Based on Polymer Magnets", Journal of Microelectromechanical Systems, 1999, pp. 2-9, vol. 8, No. 1, IEEE.

Chong H. Ahn et al., "A Planer variable reluctance magnetic micromotor with full integrated stator and wrapped coils", IEEE Micro Electro Mechanical Systems Workshop Proceedings (MEMS 1993), 1993, pp. 1-6, IEEE, United States.

William P. Taylor et al., "Electroplated soft magnetic materials for microsensors and microactuators", International Conference on Solid-State Sensors and Actuators, 1997, pp. 1445-1448, IEEE, United States.

Jean-Marie Quemper et al, "Permalloy electroplating through photoresist molds", Sensors and Actuators, 1999, pp. 1-4, vol. 74, France.

Hakan Urey et al., "FR4 (PCB) Polymer Scanners", PowerPoint, 2006, slides 1-49, Koc University.

* cited by examiner

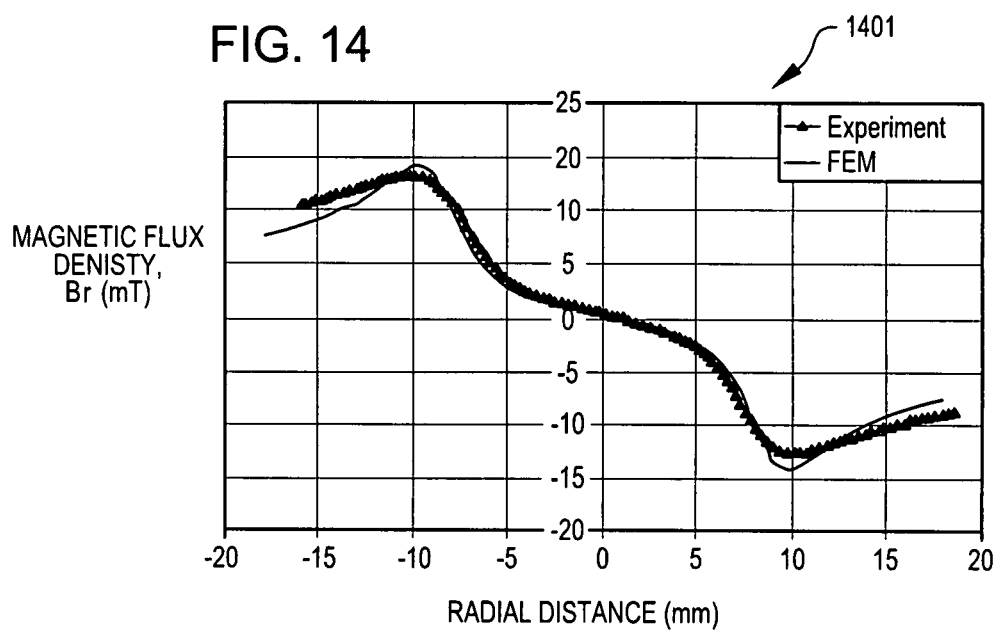
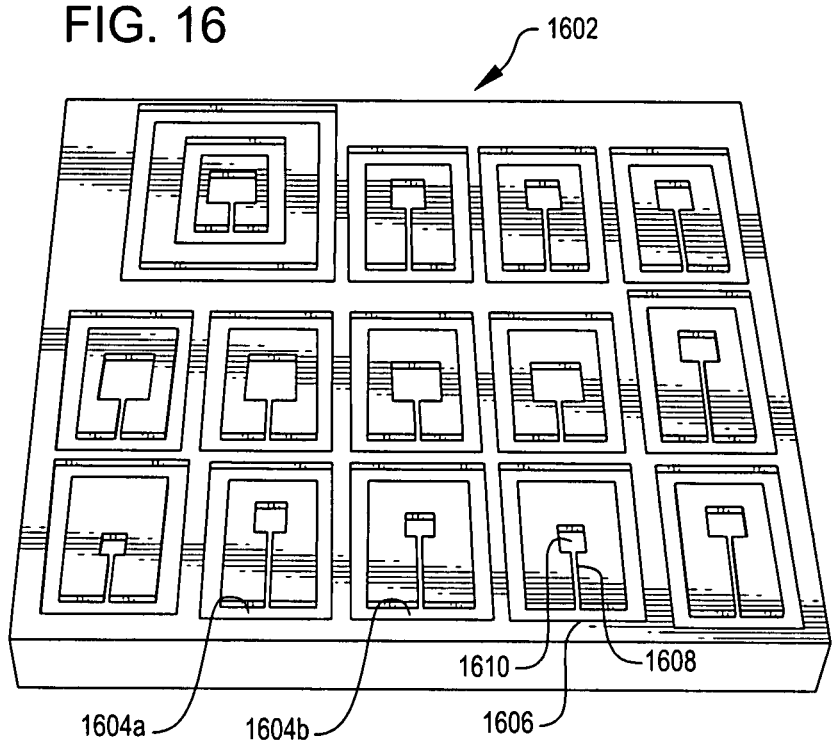

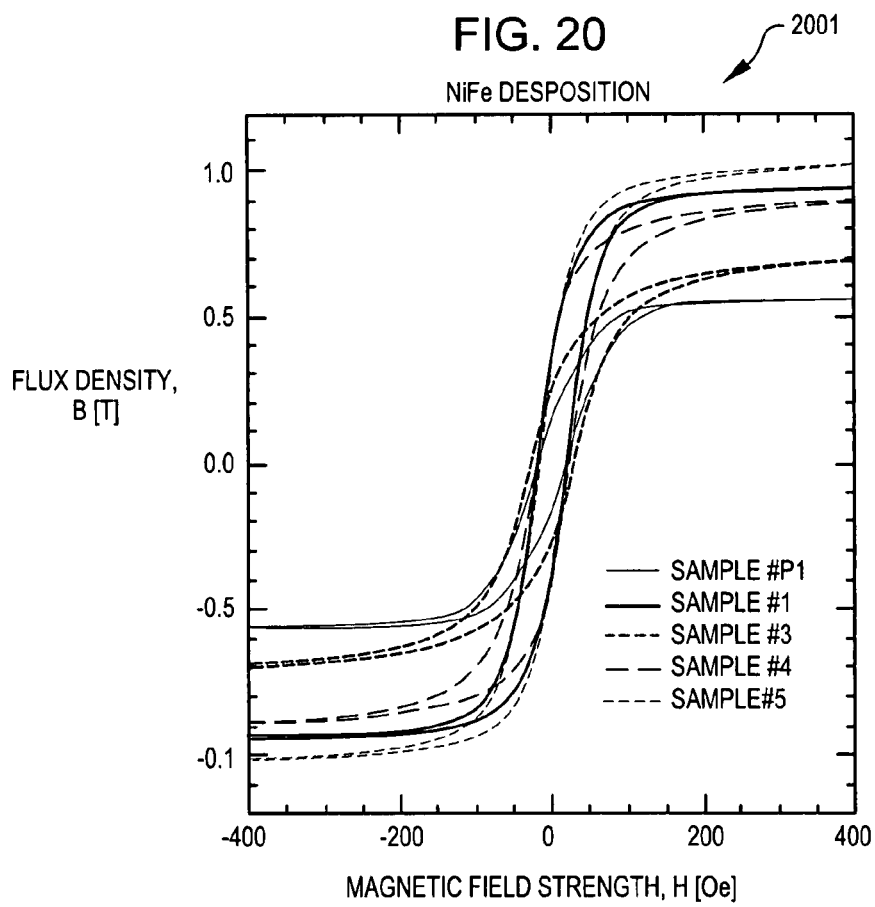
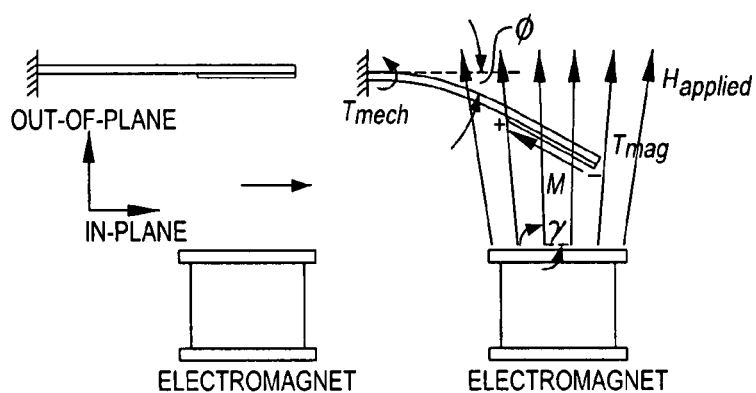

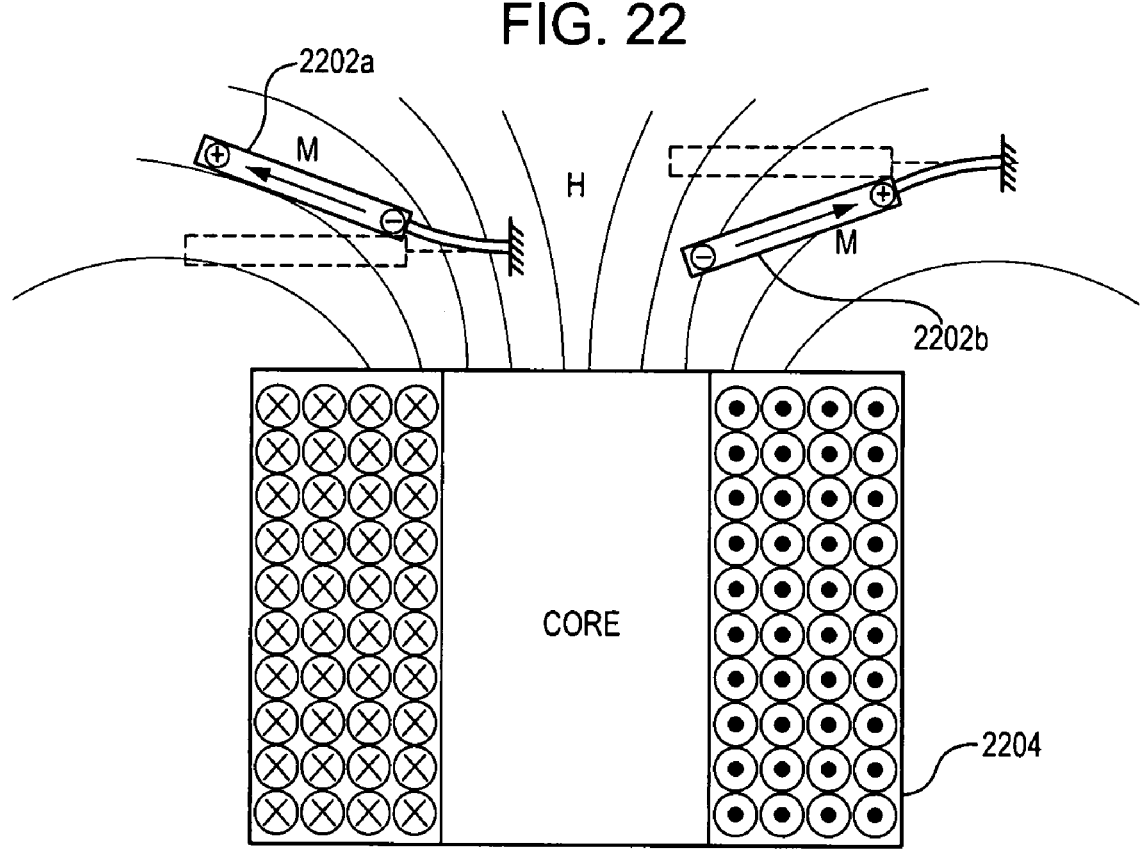

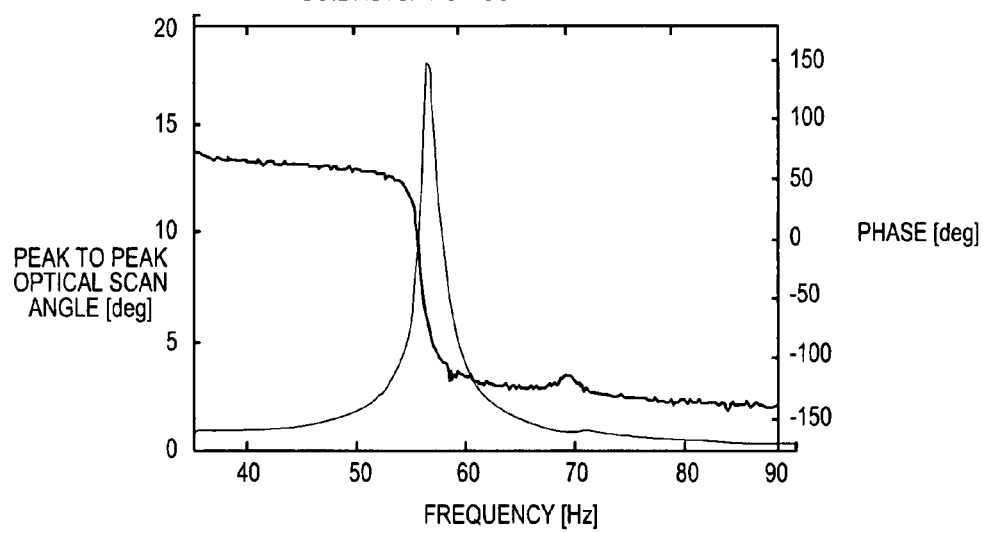
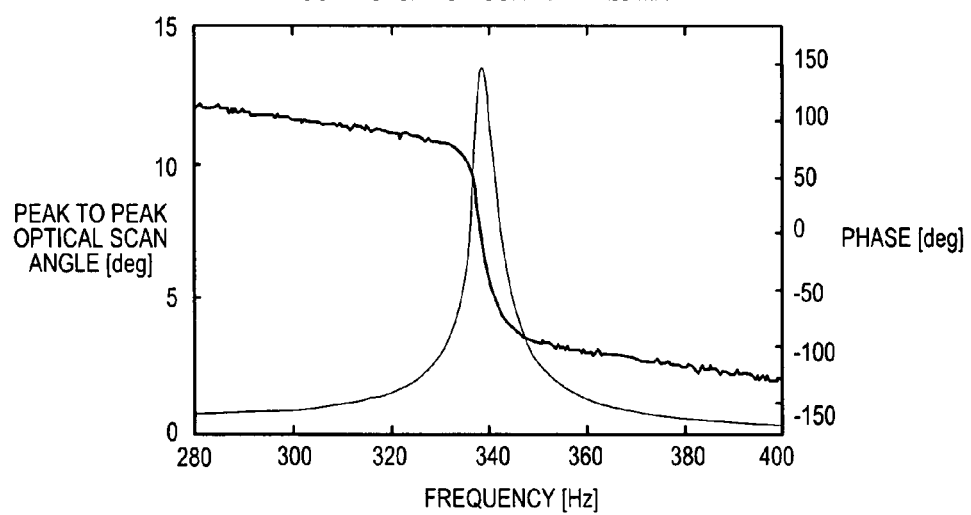

METHOD AND APPARATUS FOR MAKING AND USING 1D AND 2D MAGNETIC ACTUATORS

CROSS-REFERENCE TO RELATED APPLICATIONS

The present application claims priority benefit from and, to the extent material therein does not contradict material herein, incorporates by reference U.S. Provisional patent application Ser. No. 60/771,586, entitled METHOD AND APPARATUS FOR 1D AND 2D MAGNETIC ACTUATORS, filed Feb. 9, 2006

TECHNICAL FIELD

The present application relates to magnetic actuators, devices receiving magnetic actuation, and systems employing the same; and more particularly wherein at least a portion of the actuator and/or device is formed from non-metallic and non-semiconductor materials.

BACKGROUND

In the fields of actuated devices such as scanners, magnetically actuated systems have typically used hard magnetic materials that cannot be magnetized or demagnetized easily. In addition, scanners have often been formed from metallic and/or semiconductor materials. Such approaches have led to restrictions in design flexibility, cost, performance, form factor, and other limitations.

OVERVIEW

According to an embodiment, a scanner or other device may receive 2D actuation using a moving magnetic thin film or magnetic particles dispersed in the device, and an external coil, including a single external coil.

According to an embodiment, a soft magnetic material may be used in a moving magnet actuator system.

According to an embodiment, the magnetic axis of a moving magnet actuator may undergoing a change in direction responsive to the direction of an applied magnetic field.

According to an embodiment, a push and pull actuator may use magnetostatic forces produced by external magnets and anisotropy in magnetic thin films.

According to an embodiment, a scanner and method of making a scanner or other mechanical moving structure may use PCB-like polymer and/or epoxy-glass materials and conventional machining techniques to form at least a portion of the moving structure.

According to an embodiment, a scanner and method of making a scanner or other mechanical moving structure may use a cast, machined, molded, or otherwise formed polymeric material.

According to an embodiment, a copper layer on PCB-like polymer and/or epoxy-glass materials may be used to facilitate an electroplating process to deposit a magnetic film.

According to an embodiment, a copper layer on PCB-like polymer and/or epoxy-glass materials may be used to form a moving-coil magnetic actuator structure.

Two types of scanners may be formed according to embodiments: cantilever beam type scanners and torsional scanners. Such devices may be operated at their resonant frequencies.

According to an embodiment for barcode reader applications, a low resonance frequency (<200 Hz) may be preferred because of electronics bandwidth requirements. A low resonant frequency may be achieved with scanners formed from one or more polymers due to low Young's modulus compared to Silicon MEMS scanners.

According to embodiments, a polymer may be used as a structural material. Magnetic powder may be mixed with the polymer to form a moving magnet actuator portion. Electroplated permalloy films may be used to form moving magnet actuator portions. Moving magnet actuator portions may be used with external coils for magnetic force generation. An aluminum coating layer or aluminum coated silicon mirrors embedded in or glued on the polymer may be used to make the surface highly reflective.

According to an embodiment, polymers may be formed into a scanner by molding. According to an embodiment, an epoxy-glass fiber composite board may be shaped into a scanner using conventional machining.

According to an embodiment, polymers such as different epoxy mixes and polyimide may be used with different magnetic powders to improve the loading percentage of the magnetic material in the mixture. Magnetic particles may be coated to increase the loading concentration.

According to embodiments, processes for electroplating permalloy are disclosed. According to an embodiment, a process for electroplating low stress films with good magnetic properties provided an intended composition percentage near to 20% iron and 80% nickel.

According to embodiments magnetic actuation using electroplated thin films may be performed in both saturated and unsaturated modes of operation.

According to an embodiment, the radial component of the magnetic field may magnetize the material at small angular rotations.

According to an embodiment, a bar code reading system used the developed scanners disclosed herein. The performance requirements were met and bar code reading was successfully demonstrated.

According to an embodiment, 2D scanning was demonstrated using only one electromagnet and a scanner that simultaneously performs cantilever bending and torsion. According to an embodiment, the driving signal has at least two electrical signal components and the mechanical structure filters the at least two frequencies of the electrical signal components. Each oscillation mode responds substantially only to its resonant excitation due to the relatively high quality factor of the fabricated scanner. According to an embodiment, 2D barcode scanning may be an application for low cost scanners disclosed herein.

BRIEF DESCRIPTION OF THE DRAWINGS

FIG. 14 is a plot of FEA results vs. experimental results for the horizontal component of the magnetic flux density at various radial distances along the probe line shown in FIG. 12.

FIG. 16 is a perspective view of a multi-cavity mold for forming polymer scanners, according to an embodiment.

FIG. 20 is a graph showing the magnetic properties of various samples of electroplated permalloy soft magnetic moving actuators, achieved using various plating conditions and solutions according to embodiments.

FIG. 21 is a diagram illustrating relative positions of a cantilever scanner with moving magnet actuator made of a soft magnetic material and an external electromagnet, according to an embodiment.

FIG. 22 is an illustration showing the direction of actuation of a soft magnetic material in an applied magnetic field having vertical and radial components, according to an embodiment.

FIG. 35 is a plot showing the frequency response of the scanner of FIG. 33 in a bending mode (left-to-right on FIG. 33), according to an embodiment.

FIG. 36 is a plot showing the frequency response of the scanner of FIG. 33 in a torsional mode (up-and-down on FIG. 33), according to an embodiment.

DETAILED DESCRIPTION

Figure 1:
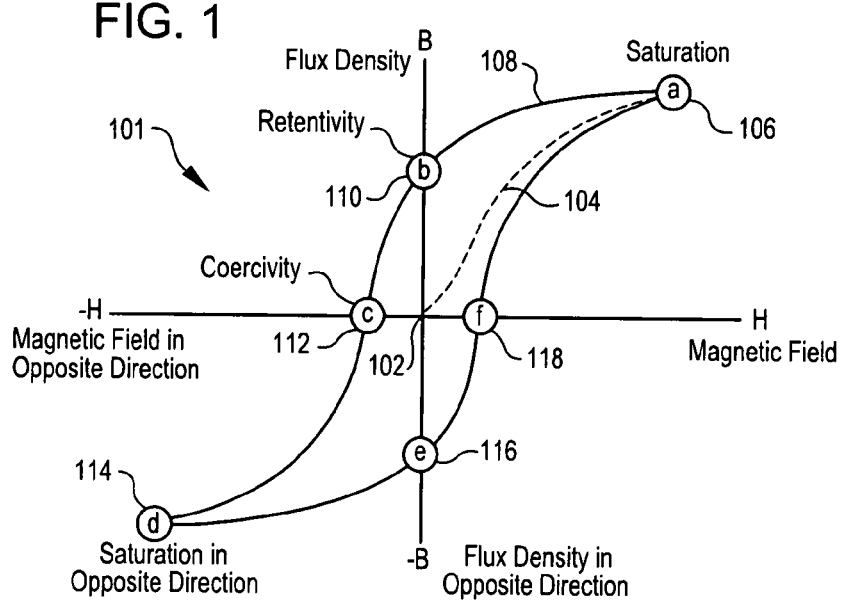
FIG. 1 illustrates a hysteresis loop of a magnetic material.

Preferred and alternative embodiments are provided with sufficient description to enable one skilled in the art to which they most closely relate to make and practice the embodiments taught herein.

According to embodiments, an actuated system may use magnetic actuation.

Magnetization of Matter

All materials are made up of atoms according to the elementary atomic model of matter. Each atom contains a positively charged nucleus and a number of negatively charged orbiting electrons. Circulating currents are generated by the orbiting electrons forming microscopic magnetic dipoles. In addition to this, a spinning positively charged nucleus and negatively charged electrons form magnetic dipole moments.

In the absence of a magnetic field, the magnetic dipoles of the atoms may have random orientation (except hard magnetic materials) resulting in no net magnetic moment. When an external magnetic field, H is applied to the material, the response of the material is called magnetic induction or magnetic flux density, B. The relationship between B and H is a property of the material and caused by the alignment of the magnetic moments of the spinning electrons and a change in orbital motion of electrons. The relationship between B and H is given by equation 1.

$$B = \mu_0(H+M) \qquad (1)$$

where $\mu_0 = 4\pi \times 10^{-7}$ is the permeability of free space and M is the magnetization. The units of M and H are A/m, B is Tesla and that of $\mu_0$ is Weber/A·m, also known as Henry/m. In some materials and in free space, B is a linear function of H; in some others B is not a single valued function of H.

Magnetization M is defined to be the magnetic moment per unit volume, as shown in equation 2.

$$M = m/V \qquad (2)$$

where m is the magnetic moment and V is the volume of the material. M is a property of the material and it depends on both the magnetic moments of atoms, ions, molecules making up the material and their interaction with each other. The magnetization, M is related to the magnetic field intensity, H by equation 3.

$$M = \chi H \quad (3)$$

where $\chi$ is the susceptibility. Substituting equation 3 into equation 1 gives the relation of equation 4.

$$B = \mu_0(1+\chi)H = \mu_0\mu_r H = \mu H \quad (4)$$

where:

$$\mu_r = 1+\chi \quad (5)$$

The variable $\mu_r$ may be referred to as the relative permeability of the material. Materials may be classified as follows:
Diamagnetic, if $\mu_r \sim <1$
Paramagnetic, if $\mu_r \sim >1$
Ferromagnetic, if $\mu_r >> 1$.

The B-H curves of paramagnetic and diamagnetic materials are generally linear. For paramagnets, relative permeability may be slightly greater than unity and for diamagnets relative permeability may be slightly less than unity. Ferromagnets may have a different B-H curve showing a phenomenon called hysteresis.

Ferromagnetic Materials

The magnetization of a ferromagnetic material may be many orders of magnitude greater than that of paramagnetic materials. Secondly, the magnetization may saturate above a certain magnetic field. Susceptibility, $\chi$ and relative permeability, $\mu_r$ may be large and positive and may be functions of an applied field. Furthermore, the magnetization may not go to zero when the applied field goes to zero. These phenomena of magnetization may be referred to as hysteresis. A graph of B versus H may provide a hysteresis loop or the B-H loop. FIG. 1 shows a typical hysteresis loop 101 for a ferromagnetic material.

The magnetic material starts from an unmagnetized state at the origin 101. When an applied field of sufficient magnitude is applied in the positive direction H, the magnetization follows the dashed curve 104 until reading saturation at point a 106. The value of B at saturation is called saturation magnetic flux density, $B_s$. When the material reaches the saturation magnetic flux density at 106, magnetization of the material saturates but magnetic flux density may continue to increase with increasing applied magnetic field strength H, as is evident from equation 1.

If the applied field, H is reduced to zero after saturation, the flux density B moves along the solid line 108 to $B_r$, referred to as the residual induction or retentively at point b 110. If the magnetic field is reversed, the state of the material again moves along the solid line 108 in a downward and leftward direction. The reverse magnetic field strength H needed to reduce the magnetic flux density to zero is called coercively, $H_c$ and may be reached at point c 112. Depending on value of the coercively, magnetic materials can be classified as hard and soft magnetic materials. When the magnetic field is increased further in the reverse direction −H, the magnetic material reaches saturation in the reverse direction at point d 114.

Similar effects are shown in the reverse direction as the applied magnetic field is changed from an absolute magnitude greater than or equal to −H to zero, and then increased from zero to greater than or equal to +H, wherein the magnetic flux density moves from point d 114, through the retentivity at 3 116, through the coercively value at f 118 and again to saturation at point a 116, respectively. When the magnetic field is swept over a range of at least −H to +H, the hysteresis loop 101 is exhibited.

Hard Magnetic Materials

Figure 2:
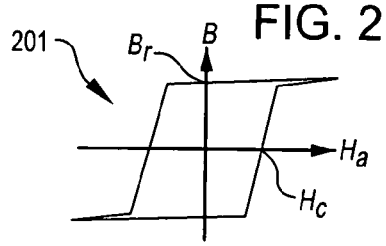
FIG. 2 illustrates a hysteresis loop of a hard magnetic material, according to an embodiment.

Hard magnetic materials cannot be magnetized and demagnetized easily. In other words, they exhibit a relatively broad hysteresis loop 201, as shown in FIG. 2. They have relatively large coercively values, so demagnetizing them requires relatively high magnetic fields. Hard magnetic materials are useful as permanent magnets. They tend to remain in one persistent direction until a large field is applied in the other direction. According to some embodiments, it may be desirable for the energy stored per unit volume in the external magnetic field to be as large as possible, since this is the energy to do work. This energy corresponds to the maximum value of the product of B and H in the second and fourth quadrants of the hysteresis loop, and may be denoted as $(BH)_{max}$. Some actuation schemes make use of the properties of hard magnetic materials.

Soft Magnetic Materials

Figure 3:
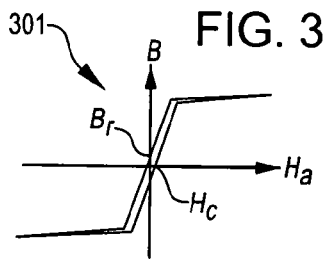
FIG. 3 illustrates a hysteresis loop of a soft magnetic material, according to an embodiment.

Soft magnetic materials generally are materials that may be magnetized and demagnetized easily. Hence, they need relatively low applied magnetic fields to change sign. In other words, a soft magnetic material may have a relatively narrow hysteresis loop 301 as shown in FIG. 3. The hysteresis loop of a soft magnetic material has a relatively small area. Such materials may be suitable for applications where repeated cycles of magnetization and demagnetization occur. Actuation schemes according to embodiments may make use of the properties of soft magnetic materials. $Ni_{80}Fe_{20}$ is one example of a soft magnetic material that may be useful for such applications because of its relatively low coercively, relatively narrow hysteresis loop, relatively large permeability and relatively large saturation magnetization. Another important advantage of $Ni_{80}Fe_{20}$ is that it may be deposited easily onto the structures such as by electroplating.

Magnetic Anisotropy

The magnetic properties of a sample may depend on the direction in which they are measured. This is a result of the magnetic anisotropy. Magnetic anisotropy may be an important factor in determining the suitability of a material and/or configuration of a material in a particular application.

Figure 4:
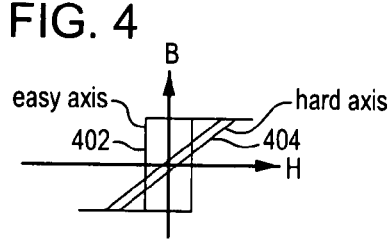
FIG. 4 illustrates hysteresis loops along hard and easy axes of a magnetic material, according to an embodiment.

In both hard and soft magnetic materials, there are certain directions along which the magnetization prefers to orient itself or tries to avoid. The preferred direction may be called the easy axis and the avoided direction may be called the hard axis. The magnitude of the magnetic field required to reach saturation along the hard axis may be much larger than the magnitude of the magnetic field required to reach saturation along the easy axis. FIG. 4 shows the hysteresis loops 402 and 404 of a magnetic sample along the easy and hard axes, respectively. The directions of the easy and hard axes are determined by the magnetic anisotropy of a sample.

In an ideal hard magnetic material, the magnetization vector does not change in magnitude and it does not rotate away from the easy axis. But in an actual magnetic material the magnetization vector may rotate away from its initial preferred position. The rotation angle of the magnetization vector is determined by the magnetic anisotropy energy. Magnetic anisotropy energy, which is minimum at the easy axis, depends on the material properties and sample geometry.

The magnetic anisotropy energy may be zero when the magnetization vector lies along the easy axis. Moving away from the easy axis, magnetic anisotropy energy may increase until it is 90 degrees away from the easy axis, reaching a maximum value along the hard axis. Such a model may be valid for a uniaxial magnetic sample. Actual magnetic samples may have more than one easy axis. Moving away from the hard axis, magnetic anisotropy energy decreases, reaching zero along the easy axis pointing at the other direction. Magnetic anisotropy energy is given by equation 6.

$$U_a = VK\sin^2\theta \quad (6)$$

where $U_a$ is the magnetic anisotropy energy, V is the volume of the sample, K is the magnetic anisotropy constant, and $\theta$ is the rotation angle of the magnetization vector.

There may be different sources of magnetic anisotropy. Such sources may be referred to as crystalline anisotropy, induced anisotropy, stress anisotropy, shape anisotropy, etc.

Crystalline anisotropy:
Crystalline anisotropy is the tendency of the magnetization to align itself along a preferred crystallographic direction.

Induced anisotropy:
Induced anisotropy is not intrinsic to the material. It is produced by a treatment such as annealing which has directional characteristics. Using such treatments material properties may be engineered, wherein the magnitude of anisotropy and the easy axis direction may be altered considerably.

Stress anisotropy:
Stress anisotropy is the change in magnetization when there is change in mechanical strain of the magnetic material. Through magnetostriction, the stress in a magnetic material induces a magnetic anisotropy.

Shape anisotropy:
Among sources of magnetic anisotropy, shape anisotropy may the easiest to control and it may also be orders of magnitude larger than the others. Shape anisotropy refers to the tendency of the magnetization to align itself along the axis of greatest length in a configuration of material.

Demagnetizing Field and Shape Anisotropy

Figure 5:
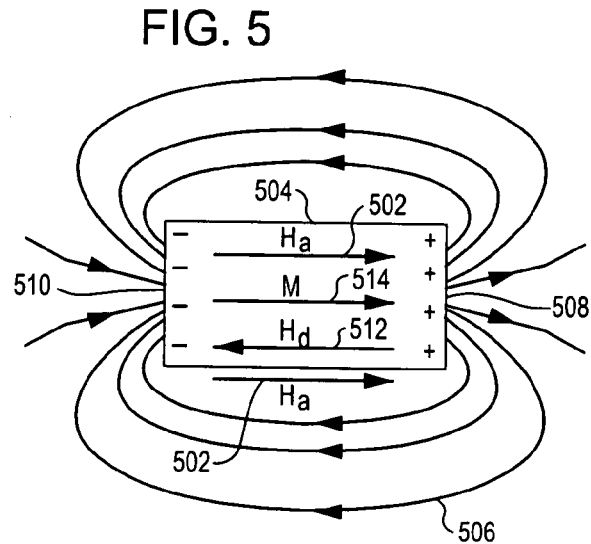
FIG. 5 shows a magnetic field applied to a magnetic sample, according to an embodiment.

To understand a demagnetizing field, assume that a magnetic field, $H_a$ 502 is applied to poll a magnetic sample 504 as shown in FIG. 5; such that the sample is magnetized from left to right, along vector M 514 in the direction of the field. After magnetization, by definition magnetic field lines of the magnetized material 506 radiate from the north pole 508 (from right end) to the south pole 510 (to left end) of the sample 504. Inside the material, the magnetic field lines 512 radiate from the north pole 508 to the south pole 510 opposing the applied magnetic field 502. This internal magnetic field 512 tends to decrease the magnetization M 514 of the material, thus causing demagnetization. The internal magnetic field 512 may be referred to as the demagnetizing field.

The demagnetizing field is formed by the magnetization such that demagnetizing field along a particular axis $H_{d x,y,z}$ is proportional to the magnetization parallel to that axis $M_{x,y,z}$, as shown in equation 7.

$$H_{d_{x,y,z}} = -\frac{N_{d_{x,y,z}}}{\mu_0} M_{x,y,z} \quad (7)$$

where $N_{dx,y,z}$ is the demagnetizing factor along a particular axis. The demagnetization factor may depend on the shape of the sample.

For elongated samples $N_d$ is smallest along the long axis and largest along the short axis. The anisotropy increases with the increasing aspect ratio. Furthermore, the total field M 514 inside of the material is the sum of the applied magnetic field $H_a$ 502 and the demagnetizing field $H_d$ 512. As demagnetizing field opposes the applied field it must be subtracted from the applied field as shown in equation 8.

$$H_i = H_a - H_d \quad (8)$$

Along the long axis, the value of $H_i$ approaches $H_a$ as the demagnetizing field may be relatively low ($N_d$ is low→$H_d$ is low). Along the short axis the demagnetizing field may be relatively large ($N_d$ is large→$H_d$ is large), such that most of the applied field goes into overcoming the demagnetizing field. Thus, it may be easier to magnetize the sample along the long axis.

The demagnetizing factor (coefficient) along a particular axis, $N_{dx,y,z}$ may be meaningfully defined for an ellipsoid with semi axes a, b and c. An ellipsoid has three shape coefficients: $N_a$, $N_a$, $N_c$. The sum of which is always unity. The magnetostatic energy density related to the demagnetizing field of a sample is given by equation 9.

$$u_{ms} = -\frac{1}{2} H_d M = \frac{1}{2} \frac{N_d M^2}{\mu_0} \quad (9)$$

If the magnetization, M of the ellipsoid makes an angle $\alpha$ with the a semi axis, $\beta$ with the b semi axis, $\gamma$ with the c semi axis, considering the component of M along each axis; the magnetostatic energy density and the overall shape anisotropy coefficient of the sample in the direction of M may be given by equations 10 and 11, respectively.

$$u_{ms} = \frac{1}{2} \frac{M^2}{\mu_0} N_d = \frac{1}{2} \frac{M^2}{\mu_0} (N_a\cos^2\alpha + N_b\cos^2\beta + N_c\cos^2\gamma) \quad (10)$$

$$N_{d_M} = N_a\cos^2\alpha + N_b\cos^2\beta + N_c\cos^2\gamma \quad (11)$$

And the demagnetizing field in the direction of M can be found by equation 12.

$$H_{d_m} = -\frac{M}{\mu_0} N_{d_M} = -\frac{M}{\mu_0}(N_a\cos^2\alpha + N_b\cos^2\beta + N_c\cos^2\gamma) \quad (12)$$

If the magnetic field is constrained in the x-y plane, the magneto static energy density may be described by equation 13.

$$u_{ms(x,y)} = \frac{1}{2}\frac{M^2}{\mu_0}(N_a\cos^2\alpha + N_b\sin^2\alpha) \quad (13)$$

Where $\gamma=\pi/2$ and $\cos\beta=\sin\alpha$. By substituting $\cos^2\alpha$ with $(1-\sin^2\alpha)$, one arrives at equation 14.

$$u_{ms(x,y)} = \frac{1}{2}\frac{M^2}{\mu_0}N_a + \frac{1}{2}\frac{M^2}{\mu_0}(N_b - N_a)\sin^2\alpha \quad (14)$$

Neglecting the constant term in equation 14, and renaming $\theta=\alpha$ gives equation 15.

$$u_{ms(x,y)} = \frac{1}{2}\frac{M^2}{\mu_0}(N_b - N_a)\sin^2\theta = K_{a(shape)}\sin^2\theta \qquad (15)$$

The magnetic shape-anisotropy constant K is then given by equation 16.

$$K_{a(shape)} = \frac{1}{2}\frac{M^2}{\mu_0}(N_b - N_a) \qquad (16)$$

According to some embodiments described herein, shape anisotropy is the dominant anisotropy because of the high aspect ratio of the structures.

Magnetic Force and Actuation Methods

According to embodiments, magnetic actuators may be classified as moving coil actuators and moving magnetic material actuators depending on their moving parts. Moving magnetic material actuators may further be classified, according to embodiments, as moving hard magnetic material actuators and moving soft magnetic material actuators.

Forces and Torques on Magnetic Charges

There are pairs of complementary magnetic charges bound to magnetized materials that act as sources of H and M. The existence of these magnetic charges may be derived from the Maxwell's equations 17 and 18.

$$\nabla \cdot B = \nabla \cdot (\mu_0 H + M) = \mu_0 \nabla \cdot H + \nabla \cdot M = 0 \qquad (17)$$

$$-\nabla \cdot M = \mu_0 \nabla \cdot H = \eta_m \qquad (18)$$

Where $\eta_m$ is the magnetic charge density. The total magnetic charge, $\phi$ can be calculated integrating $\eta_m$ over volume v as shown in equation 19.

$$\phi = \int_v \eta_m dv = MS \qquad (19)$$

Where S is the pole surface and M is the magnetization.

When a magnetic field is applied on a magnetic pole, a force F is induced on the magnetic pole given by equation 20.

$$F = \phi H = MSH \qquad (20)$$

Figure 6:
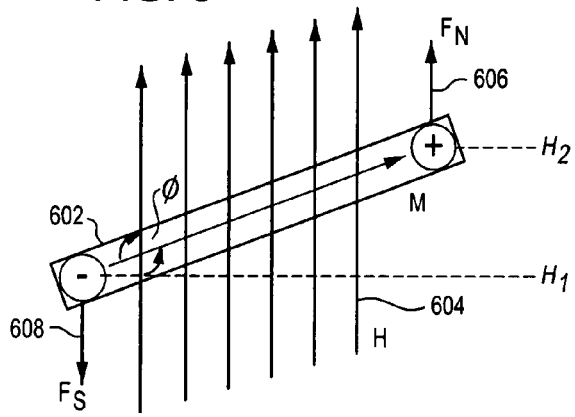
FIG. 6 illustrates a volume of magnetic material placed at an angle to a magnetic field and the resultant generation of forces, according to an embodiment.

FIG. 6 illustrates a volume of magnetic material 602 placed at an angle, $\phi$ to the magnetic field 604. A torque, T is generated by the force vectors $F_N$ 606 and $F_S$ 608 generated at the north and south poles of the material, respectively.

When a magnetic material with constant magnetization is placed inside a uniform magnetic field (i.e., $H_1=H_2$), the poles experience equal forces but in opposite directions. If the material is parallel to (i.e. aligned with) the magnetic field lines, the torque is zero. If the magnetic material is placed at an angle, $\phi$ to the magnetic field a torque, T is generated given by equation 21.

$$T = \phi Hl \sin\phi = MHV\sin\phi \qquad (21)$$

Where l is the length and V is the volume of the sample. The corresponding magnetostatic energy is given by equation 22.

$$U_{ms} = -VH \cdot M = -VHM\cos\phi \qquad (22)$$

Thus, when the torque is minimum, magnetostatic energy is maximum, and vice versa. The torque T, may be found by taking the derivative of the magnetostatic energy with respect to the angular variable, $\phi$, as shown in equation 23.

$$T = -\frac{dU_{ms}}{d\phi} = VHM\sin\phi \qquad (23)$$

Magnetic Anisotropy Torque

The magnetic anisotropy energy, given in equation 15 increases as the magnetization vector moves away from the easy axis. A magnetic restoring torque is generated as a result and tries to realign the magnetization vector with the easy axis, the torque being defined in equation 25.

$$T = -\frac{dU_a}{d\theta} = -2VK\sin\theta\cos\theta = -VK\sin 2\theta \qquad (25)$$

From equation 25 it may be seen that the restoring torque is maximum at $\theta = \pm\pi/4$.

Lorentz Force

A conductor of length l in a magnetic field density, B experiences a force called the Lorentz force when a current I flows through it. This force is given by equation 26.

$$F = I(l \times B) \qquad (26)$$

This force is maximum when the applied field is perpendicular to the conductor through which the current flows.

Moving Coil Actuators

Figure 7:
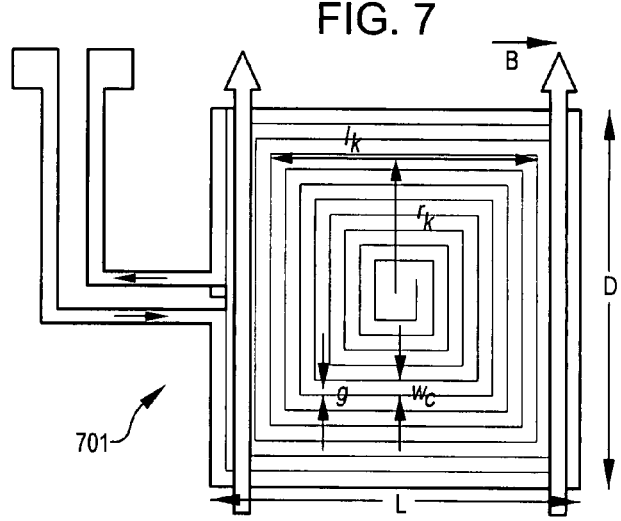
FIG. 7 is a diagram of a moving coil actuator, according to an embodiment.

FIG. 7 shows a moving coil actuator 701. For simplicity the torsion bars are not shown. A moving coil magnetic actuator uses Lorentz forces for actuation. FIG. 7 illustrates a magnetic torsional actuator used as a microscanner. This kind of device provides guiding of the current lines on the actuator. Lorentz force causes the springs to move in the magnetic field of an external source such as a magnet. The force acting on a single coil is given by equation 27.

$$F = B_\perp I l_k \qquad (27)$$

Where $B\perp$ is the perpendicular component of magnetic flux density to the coil, I is the current passing through the coil and $l_k$ is the length of the $k^{th}$ coil. The torque is found by multiplying the force with the distance of the coil from the torsional axis, $r_k$. To find the total torque the torque of every coil must be summed as shown in equation 28.

$$T_{total} = 2\sum_{k=1}^{n} B_\perp I l_k r_k \qquad (28)$$

Where n is the number of coils.

Moving Hard Magnetic Material Actuators

Figure 8:
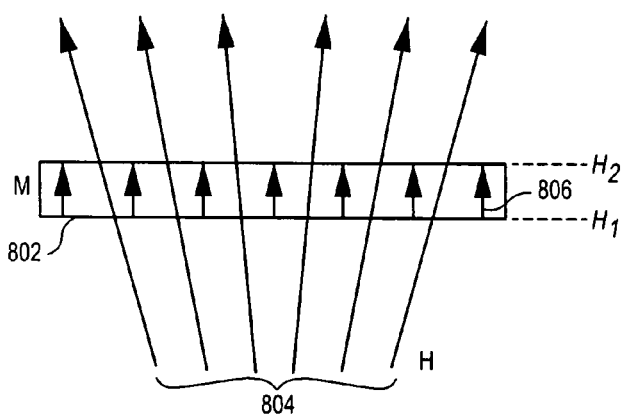
FIG. 8 is a diagram of a moving magnet actuator made of a hard magnetic material, according to an embodiment.

FIG. 8 illustrates a hard magnetic material moving magnet 802 actuator. If the magnetic field 804 has a rate of change with respect to a displacement (i.e., $H_2$ is not equal to $H_1$), a magnetic force is produced. The direction of magnetization 806 maybe normal to the surface. The magnetization often does not change with the applied magnetic field. $H_1$, the force F is upward. If $H_1 > H_2$ the force F is downward.

The magnetization vector of a hard magnetic material does not change in magnitude or direction under typical operating conditions. These materials may make use of the forces and torques as described in above. If the magnetization vector is not aligned with the magnetic field, a torque given by equation 21 may be generated.

Translational forces are also possible with this kind of actuator. If the magnetic field has a rate of change with respect to a displacement, the magnetic force is given by equation 29.

$$F_{x,y,z} = M_{x,y,z} \int \frac{d}{d(x, y, z)} H_{x,y,z} dv \quad (29)$$

Where $M_{x,y,z}$ is the magnetization along the axis x or y or z and $H_{x,y,z}$ is the applied field along the same axis. The derivative is taken with respect to the same displacement variable and integration is performed over the entire volume.

The force may be bidirectional since the magnetization vector does not rotate. By changing the direction of the applied field the direction of the force can be altered. The force may not be maximum where the magnitude of the applied field is maximum. The force reaches maximum at the point where the gradient of the magnetic field is maximum. This point may be different than the location of the maximum magnetic field.

Moving Soft Magnetic Material Actuators

Figure 9:
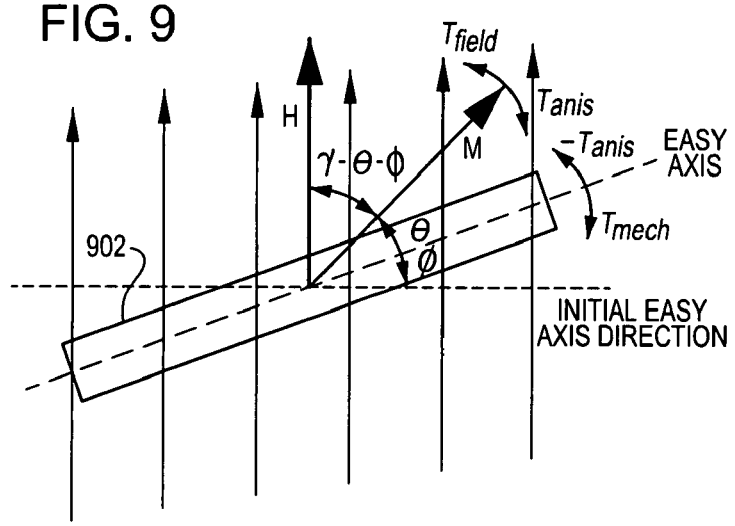
FIG. 9 is a diagram of a moving magnet actuator made of a soft magnetic material, according to an embodiment.

FIG. 9 illustrates a moving magnet actuator 902 based on a soft magnetic material, according to an embodiment. A uniform magnetic field, $H_a$ may be applied to a magnetic sample with magnetization M and magnetic anisotropy K. The initial angle between the applied field and the easy axis of the magnetic sample is γ. The applied field exerts a torque, $T_{field}$ on the magnetization vector is given by equation 30. The anisotropy opposes the torque field with a restoring torque, $T_{anis}$ given by equation 31.

$$T_{field} = VHM \sin(\gamma - \theta - \phi) \quad (30)$$

$$T_{anis} = -VK \sin 2\theta \quad (31)$$

Where θ is the angle between the magnetization vector and the easy axis, and φ is the angle of deflection of the material.

The moving magnet actuator 902 starts to deflect because of the restoring anisotropy torque, $T_{anis}$. A mechanical torque, $T_{mech}$ opposes the restoring anisotropy torque, $T_{anis}$. The mechanical torque may be expressed by equation 32.

$$T_{mech} = -k_\phi \phi \quad (32)$$

Where φ is the angle of deflection and $k_\phi$ is the angular stiffness. In equilibrium the net torque on the magnetization vector and the net torque on the magnetic sample are zero, as shown by equations 33 and 34, respectively.

$$T_{field} + T_{anis} = 0 \quad (33)$$

$$-T_{anis} + T_{mech} = 0 \quad (34)$$

This implies that the magnitude of $T_{field}$, $T_{anis}$ and $T_{mech}$ are all equal. Using equations 31 32 and 33 angular mechanical deflection, φ can be solved, as shown in equation 35.

$$\phi = \left(\frac{VK}{k_\phi}\right) \sin(2\theta) \quad (35)$$

Substituting equation 35 into equation 30 goves equation 36.

$$T_{field} = VHM \sin\left(\gamma - \theta - \left(\frac{VK}{k_\phi}\right) \sin(2\theta)\right) \quad (36)$$

And substituting equations 31 and 36 into equation 33 gives equation 37.

$$VK \sin(2\theta) = VHM \sin\left(\gamma - \theta - \left(\frac{VK}{k_\phi}\right) \sin(2\theta)\right) \quad (37)$$

Equation 37 may be solved iteratively to obtain the angular mechanical deflection, φ, and angular magnetization deflection, θ.

For a magnetic sample with a length to thickness ratio of 4 the magnetization vector does not deflect very far from the easy axis (θ<2 deg). According to an embodiment, the calculated mechanical deflections of soft magnetic structures with large length to thickness ratios are very similar to the calculated mechanical deflections of structures modeled as ideal hard magnetic materials. So the structures with high length to thickness ratios can be modeled as ideal hard magnetic materials.

According to an embodiment, soft magnetic material used for a structure has dimensions of l=8 mm, w=8 mm and t=28 μm, providing a length to thickness ratio of 285. Thus, according to an embodiment for scanners, the dominant anisotropy is the shape anisotropy and the other sources of anisotropy may be neglected.

One may take the simplifying assumption that the magnetization vector of soft magnetic structures described according to embodiments herein does not deflect from the easy axis because of high shape anisotropy. In this case the magnetic torque, $T_{field}$ may be simplified to equation 38.

$$T_{field} = VMH \sin(\gamma - \phi) \quad (38)$$

The mechanical restoring torque, $T_{mech}$ is given by equation 32. As $T_{field} + T_{mech} = 0$, the equilibrium angular mechanical deflection can be found by equation 39.

$$\phi = \left(\frac{VMH}{k_\phi}\right) \sin(\gamma - \phi) \quad (39)$$

Electromagnet Modeling

Magnetic actuators require external magnetic fields to function. Many actuators are excited with the help of electromagnets to provide control of the applied field. An external permanent magnet may be used with moving coil actuator because the torque may be controlled by the coil current. For moving magnet embodiments (i.e, soft and hard magnetic material placed on the moving structure) an external electromagnet is used to control the torque.

Single-Turn Coil Theory

Figure 10:
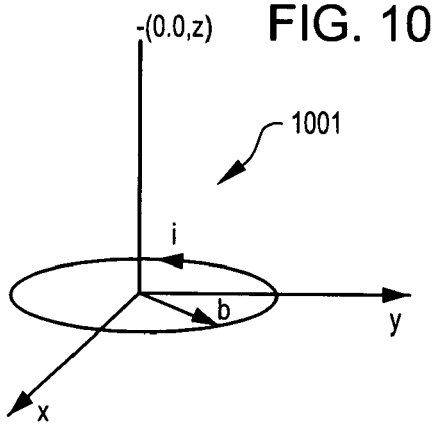
FIG. 10 is a diagram of a circular coil carrying current, according to an embodiment.

FIG. 10 illustrates a coil 1001 carrying current, I. The magnetic field generated by a circular coil can be calculated from the Biot-Savart law. In [0111]

Figure the vertical (z) component of the magnetic field intensity at a point on the axis of a circular loop of radius b that carries a current I is given by equation 40.

$$H(z) = \hat{a}_z \frac{I \cdot b^2}{2 \cdot (z^2 + b^2)^{\frac{3}{2}}} \qquad (40)$$

To determine the magnetic field of a coil with n turns, the contribution of each turn is summed. General formulas giving the magnetic field at any point in space may be found in the prior art, including electromagnetic textbooks.

FEM Analysis

Theoretical calculations are useful for calculating magnetic fields of two dimensional coils (one or few layers) such as micro fabricated coils on silicon wafers or coils on printed circuit boards. Analytical calculations are difficult for three dimensional coils wound on a core, such as the coils used herein. Finite element modeling provides easier and more effective results.

Figure 11A:
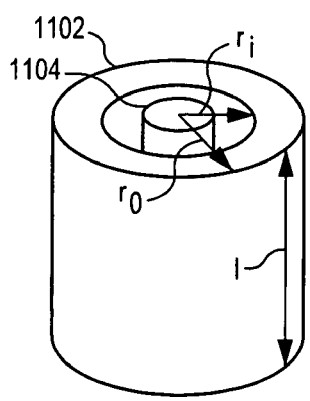
FIG. 11A represents a three-dimensional model of an electromagnet used for finite element modeling, according to an embodiment.
Figure 11B:
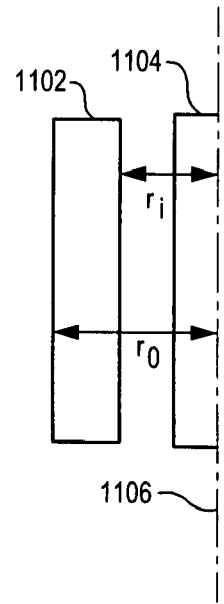
FIG. 11B represents a two-dimensional model corresponding to the 3D model of FIG. 11A, used for finite element modeling according to an embodiment.

FIGS. 11A and 11B show a coil modeled by an area penetrated by a current, I times the number of turns, N. A 2-D model with rotational symmetry is used. FIG. 11A is a 3-D representation of the model. FIG. 11B shows a 2-D model with rotational symmetry.

FIG. 11A illustrate an N turn coil 1102 with an inner radius of $r_i$, an outer radius of $r_o$, a length of l, and a magnetic core 1104 at its centre. The electromagnet is modeled using FEM-LAB 3.1. Due to the computation time and number of element limitations of the software, a two dimensional model with rotational symmetry axis 1106 is used as shown in FIG. 11B. The coil 1102 is represented by an area penetrated by the current I times the number of turns N.

Static magnetic analysis was performed and the magnetic fields and flux densities generated by the coils were simulated for the different coils used according to embodiments. Both the radial and the vertical components of the magnetic field determine the generated torque depends on both. The radial component magnetizes the soft magnet, according to an embodiment, and the vertical component generates the torque on the magnetized soft magnetic material.

Figure 12:
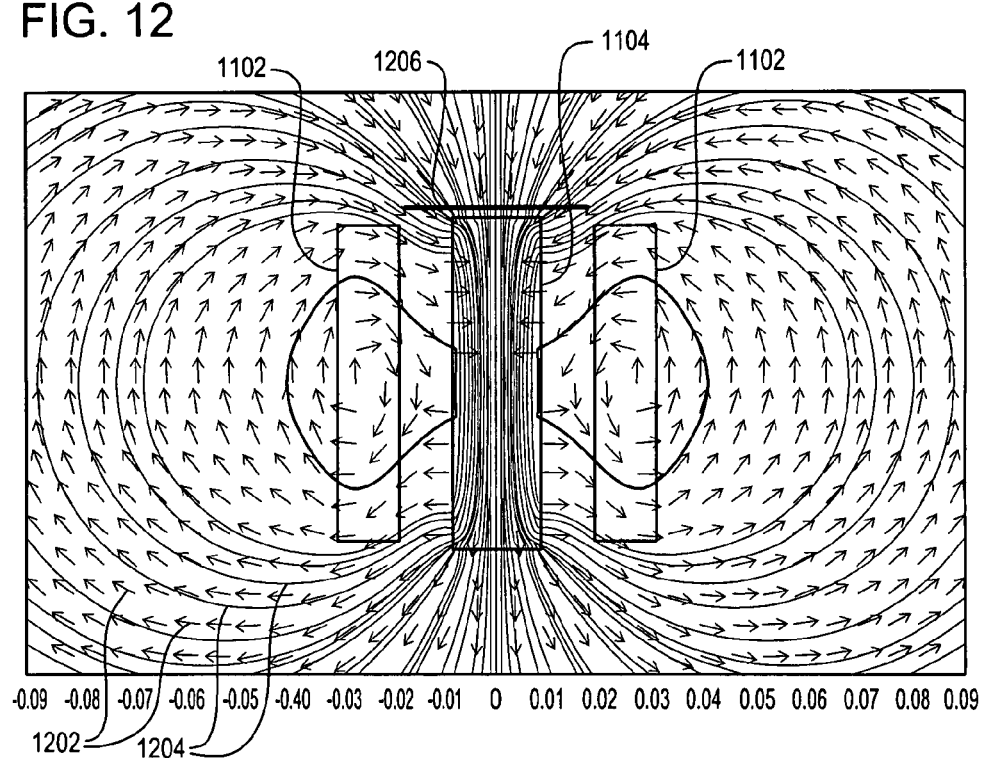
FIG. 12 illustrates the result of a finite element analysis showing magnetic flux density and magnetic field produced by the modeled electromagnet of FIGS. 11A and 11B, according to an embodiment.

In FIG. 12, arrows 1202 show the magnetic flux density and the streamlines 1204 show the magnetic field when 0.5 Amperes were applied to the coil 1102 with the dimensions and properties given in Table I.

The maximum magnetic flux density appears inside the core 1104 because of its high relative permeability. On the outside, the maximum magnetic flux density is obtained at the corners of the core. The line 1206 that is 1.5 mm above the core shows the line of points where magnetic measurements are taken and compared with the FEM simulations.

TABLE 1

| Inner radius | $r_i$ | 18.75 mm |
|---|---|---|
| Outer radius | $r_o$ | 30.75 mm |
| Radius of the core | $r_{core}$ | 8.5 mm |
| Length of the coil | l | 60 mm |
| Length of the core | $l_{core}$ | 62 mm |
| Relative permeability | $m_{ur}$ | 5000 |
| Number of turns | N | 1200 |

The material properties and dimensions of a coil with magnetic core.

Experimental Results

Figure 13:
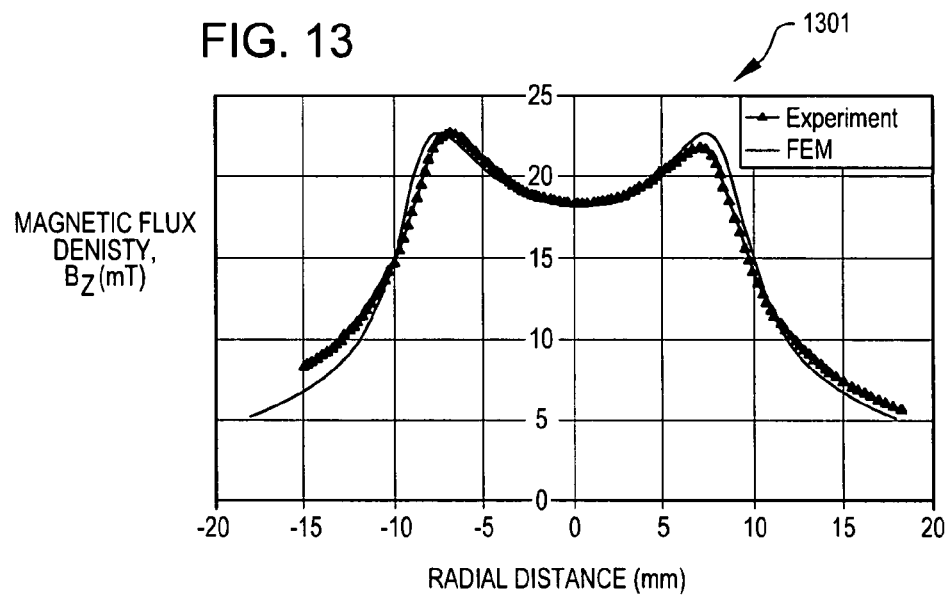
FIG. 13 is a plot of FEA results vs. experimental results for the vertical component of the magnetic flux density at various radial distances along the probe line shown in FIG. 12.

FEM results of were confirmed experimentally using a Bell Probe to measure both the vertical and the radial components of the magnetic flux density. Measurements are taken at 1.5 mm away from the top surface of the coil along the line 1206 illustrated in FIG. 12 at 0.25 mm increments. FIGS. 13 and 14 show the experimental and FEM simulation results for the vertical and the radial components of the magnetic flux density ($B_z$ and $B_r$), respectively. The simulation and experimental results are in good agreement. The maximum values of $B_z$ and $B_r$ were attained near the top of the coil wires but not exactly at the same position. Other coil geometries were also modeled using FEM in a similar way and the electromagnetic force and torque are computed using the equations given above.

Fabrication and Material Characterization

According to an embodiment, simple and low cost scanners may be formed using polymers as structural materials. Magnetic powders mixed in the polymer and/or electroplated permalloy films may be used with external coils for magnetic force generation. Aluminum (Al) coating layer or Al-coated silicon mirrors embedded in the polymer were used to make the surface highly reflective.

Polymers may be used as a structural material in active mechanical scanning structures. According to an embodiment, the process developed may be simple and not require any lithography steps for fabrication. A molding procedure, according to an embodiment, is explained below.

For the soft magnetic material, permalloy and magnet powders were used. Permalloy was chosen because of its good magnetic properties and the relative ease of producing thick layers of permalloy by electrode position. Adding magnetic powder to the polymer, i.e., making a polymer magnet, does not require additional fabrication steps. Adding magnetic powders is compatible with the molding process described herein.

According to an embodiment, another method for producing scanners uses widely available epoxy-glass fiber composite boards and shaping them with conventional machinery.

Molding

Figure 15:
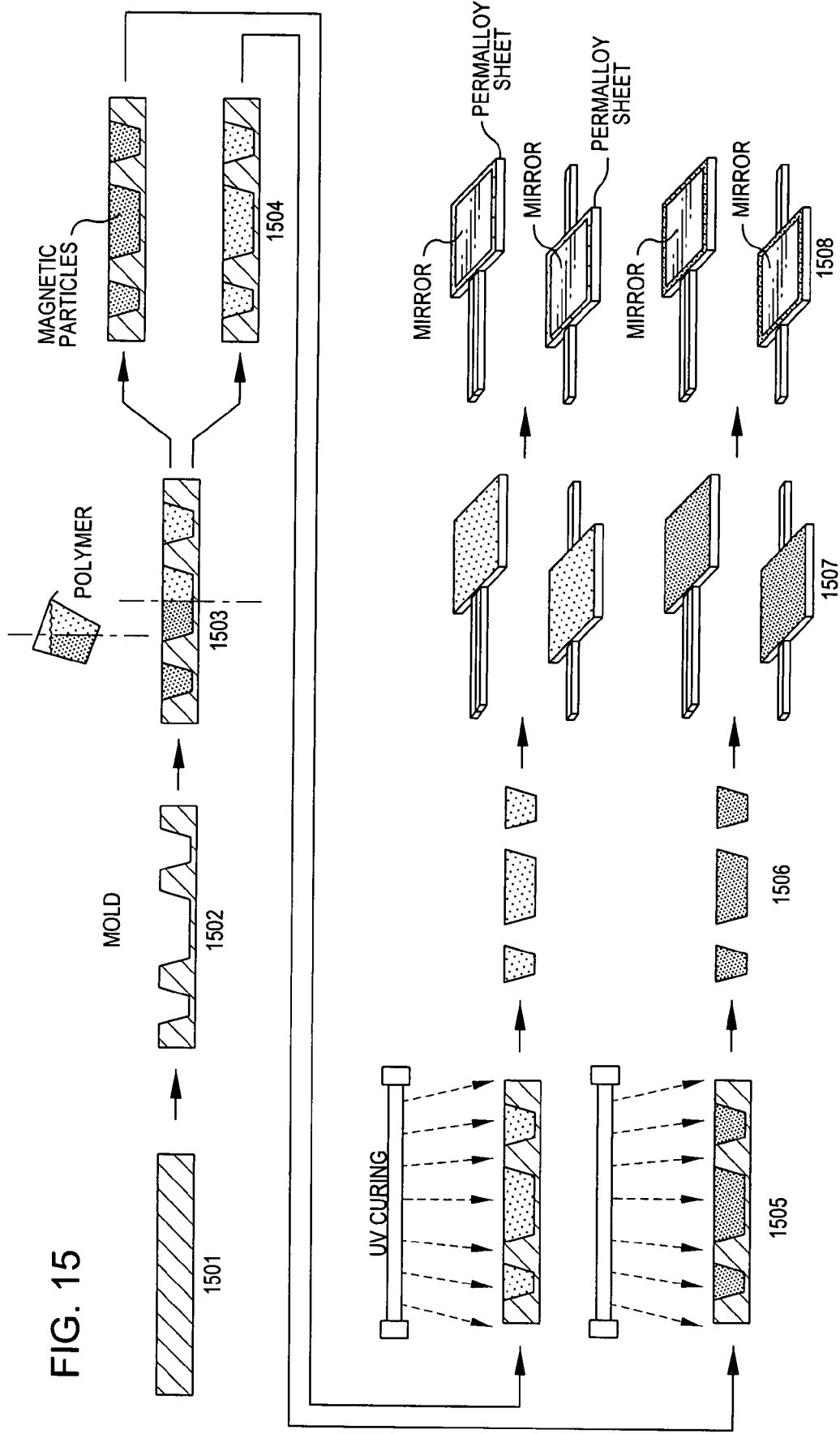
FIG. 15 illustrates methods of making polymer scanners with moving magnet actuators comprising soft magnetic materials, according to embodiments.

FIG. 15 illustrates the basic fabrication steps for the photo sensitive polymers such as RenShape SL5195 (which is used in stereo-lithography for rapid prototyping) according to embodiments. The basic procedure does not necessarily change for other materials except some minor differences. RenShape SL5195 is a UV sensitive polymer, meaning that the liquid material becomes solid when it is exposed to UV light.

Steps 1501, 1502 Preparation of the Mold

Steps 1501 and 1502 pictorially represent the preparation of the mold, which may be used repeatedly for replicating devices. Fabrication of the mold can involve conventional machining or lithography process depending on the desired tolerances.

A mold may be made out of an aluminum block for example. Shapes may be formed by a CNC (Computer Numerical Control) milling machine. According to an embodiment, such a process may have a few microns of sensitivity. According to an embodiment, the smallest feature size was limited to about 500 µm.

FIG. 16 shows a multi-cavity aluminum mold prepared by a CNC milling machine according to an embodiment. According to another embodiment, silicon wafers may be used as the mold. Using anisotropic etching of silicon wafers for example, molds for smaller sized structures may be prepared.

The mold 1602 includes a plurality of cavities 1604a, 1604b for forming polymer scanners. Because of the prototypical nature of the reduction to practice, a number of different cavity shapes were included in the mold to provide comparative scanner samples for experiments. Each cavity, according to the embodiment of FIG. 16, included at least a mounting structure region 1606 configured to produce a mounting structure for coupling the scanner to external structures, at least one flexure region 1608 configured to produce a flexure for supporting and constraining rotation, and a scan plat region 1610 configured to produce a scan plate.

Steps 1503, 1504 Thermo-plastic, Thermo-set, Radiation-Induced Cross-Linking or other Liquid Material May be Put into a Mold:

According to an embodiment, magnetic powder may be mixed with the polymer and the mixture put into the mold. According to another embodiment, scanners with a non-integral actuator such as permalloy, the polymer may be injected to the mold without adding any magnetic powder.

Step 1505 UV Curing:

The liquid polymer or polymer-magnetic powder mixture was exposed to UV light until it was completely cured and solid. Curing of the polymer magnetic powder mixture takes longer time as magnetic powder decreases the transparency of the polymer. Curing the material that is at the bottom of the mold is more difficult, thus the thickness of the device and the magnetic powder concentration in the photo sensitive polymer may be limited. Forming the device out of several layers formed over one another or using a polymer with a different curing method may be solutions to this slow curing of relatively newly loaded materials. Some polymers may be cured with addition of a catalyst. One challenge with this process is maintaining the thickness of the device relatively precisely and the prevention of air bubbles in the polymer while curing according to one approach. According to one approach, the thickness was better controlled by placing a top cover glass over the mold cavity and/or performing curing in an enclosure while pumping dry nitrogen into the space above the mold cavity.

Steps 1506, 1507 Removing the Devices from the Mold:

Before the last step the devices are removed from the mold. Stiction was found to be a problem in this step. Release chemicals such as fluorine and silicon based sprays may be used to avoid stiction. Before injection of the polymer, a thin layer of these chemicals were applied to the mold cavity. Cleaning of the mold, such as with acetone may provide easy removal. According to other embodiments, selection of mold materials, impregnation of the mold with a release agent, treatment of the mold such as controlling it's temperature, including ejectors, election of the polymer, and other typical processes used to aid removal of molded materials may be used. As may be seen molded polymer scanners with and without embedded magnetic particles were produced.

Step 1508 Attaching the Mirror:

According to embodiments, a mirror may be attached to the scanner. The mirrors may be prepared by evaporating aluminum onto a thin polished silicon wafer to make it highly reflective. Then the wafer is diced into pieces with the desired dimensions to use as mirrors. Alternatively, the mirror may be covered with a protective tape or other protective layer and placed at the bottom of the mold before the polymer is put in. Alternatively, a mirror may be glued on top of the polymer molding. Permalloy may also be added to the scanner.

Scanners with Electroplated Magnet (e.g. Permalloy)

According to embodiments, scanners with heterogeneous, or separate magnets, such as, electroplated permalloy, for example, the mixing of magnetic powder with polymer may be omitted in the fabrication process. A separate magnet, such as, electroplated permalloy is glued to the scanner. According to an embodiment, permalloy may be electroplated directly on the polymer using a conductive seed layer. For example, copper was tried as a seed layer using the process developed for depositing copper on epoxy boards for printed circuit boards (PCB).

Experiments showed the adhesion of copper to the polymers tried was not as good as desirable for some applications. However, adhesion may be sufficient for other applications and/or with process and/or material modifications.

In another embodiment silicon wafers were plated and diced Silicon pieces with Al mirror on one side and permalloy film on the other side was used Diced Silicon pieces may be attached to or embedded in polymer to make molded micro scanners. Silicon wafers may have Titanium/Gold seed layers for permalloy film electrode position. The details of electrode position of permalloy is described below. According to another embodiment, thin sheets of permalloy may be released from their base materials using differential stress, and subsequently attached to the scanner.

Epoxy—Glass Fiber Composite Scanners

Figure 17:
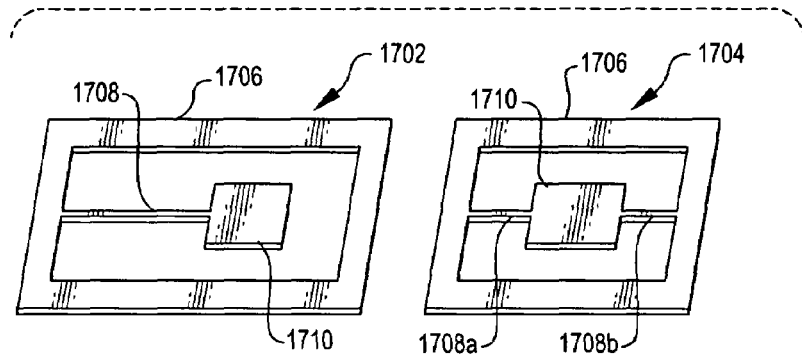
FIG. 17 is a perspective view of two embodiments of epoxy/glass fiber (FR4) scanners.

FIG. 17 illustrates two embodiments 1702, 1704 of epoxy/glass fiber scanners. An alternative to molding for fabricating scanners is shaping epoxy-glass fiber boards, such as, by conventional machining. Epoxy—glass fiber composite boards are widely used by printed circuit board (PCB) manufacturers. Boards with copper on top and bottom surfaces are commercially available in a variety of thicknesses. The copper layer on the surface may be used as a seed layer for electrode position, making for a relatively simple fabrication process. Embodiments with thicknesses varying from 0.13 mm to 1 mm were prepared. These were cut by a computer controlled milling machine, to form the desired geometries. One aspect of this method is that cutting is done in 2-D, allowing fixed thickness throughout the device. Alternative embodiments may allow multiple thicknesses, such as, by laminating substrates of varying shape to build up more complex 3D shapes.

The embodiment 1702 is a cantilever scanner substrate that includes a mounting structure 1706, a single flexure 1708, and a scan plate 1710 suspended by the flexure 1708. The embodiment 1704 is a torsional scanner substrate that includes a mounting structure 1706, two flexures 1708a, 1708b configured as torsion arms, and a scan plate 1710 suspended by the torsion arms 1708a and 1708b.

Electroplating

The magnetic material (e.g. permalloy) for a second embodiment of scanners may be formed by electroplating. Magnetic materials may be deposited in a variety of ways. Thermal evaporation, sputtering and electroplating are some exemplary methods. Electroplating is a typical method used to deposit thick films (>10 μm). Electroplating of magnetic materials may be performed using prior art methods.

Figure 18:
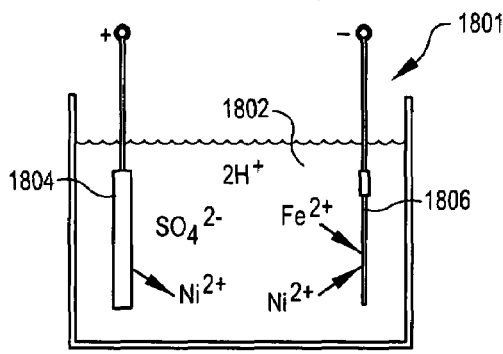
FIG. 18 illustrates an electroplating process used to plate a soft magnetic material onto a polymer (including epoxy and glass fiber) scanner, according to an embodiment.
Figure 19:
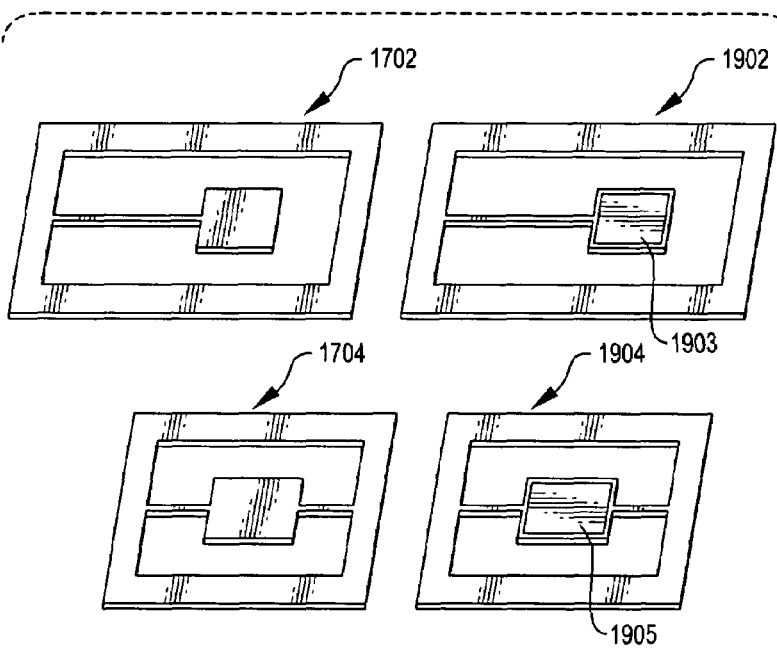
FIG. 19 provides perspective views of two types of epoxy and glass fiber scanners before and after plating with soft magnetic material, according to embodiments.

An electroplating apparatus 1801, shown diagrammatically in FIG. 18, includes of an aqueous metal solution 1802, an anode 1804, a cathode 1806 and a power supply (not shown). For NiFe electroplating the anode is made of nickel and the cathode is made of another conductive material where the deposition occurs. The aqueous solution contains nickel ($Ni^{2+}$) and iron ($Fe^{2+}$), hydrogen ($H^+$) and sulfate ($SO_4^{2-}$) ions. When a voltage is applied between the anode and cathode, the positively charged ions are attracted by the negatively charged cathode. The Ni and Fe ions reaching the cathode gain electrons to form metallic nickel and iron, respectively and they become plated onto the cathode. At the same time the anode releases Ni ions to the aqueous solution while electrons are supplied by the power supply. According to one embodiment, there is no source for the Fe ions, so after a while they may be depleted, leading to a bath that has a limited life time. Hydrogen ions are also attracted by the cathode. When they reach the cathode they gain electrons and form $H_2$ bubbles. To avoid the formation of $H_2$ bubbles, the cathode may be periodically removed from the solution for a short time.

To deposit magnetic material, a conductive plating base or seed layer is provided as a cathode. As described above, the attachment of magnetic material to the scanner may be accomplished according to at least two embodiments. For the epoxy—glass fiber composite scanners, Cu, which may be provided on the surface of the board, may be used as a seed layer. A thick layer of photoresist was coated onto desired areas to define the shape of the plated material. After the electroplating process, the photoresist is stripped.

For the scanners with an attached silicon wafer, an adhesion layer of titanium and an electroplating seed layer of gold may be deposited by evaporating onto the silicon wafer. According to an embodiment, no mask was used for the silicon wafers. The silicon wafers were diced into pieces having desired dimensions after electroplating.

One bath composition used is given in Table 2. The volume of the electroplating bath was approximately 2 liters with an interelectrode distance of 10 cm. Various current densities were applied without stirring.

TABLE 2

Composition of Nickel-Iron Electroplating Solution

| Material | | Quantity |
| --- | --- | --- |
| Nickel Sulfate | $NiSO_4 \cdot 6H_2O$ | 200 g/l |
| Ferrous Sulfate | $FeSO_4 \cdot 7H_2O$ | 8 g/l |
| Boric Acid | $H_3BO_3$ | 25 g/l |
| Nickel Chloride | $NiCl_2 \cdot 6H_2O$ | 5 g/l |
| Saccharin | $C_7H_4NO_3S \cdot Na \cdot 2H_2O$ | 3 g/l |

Composition of nickel—iron electroplating solution. The temperature=23° C.

The total plating area, the total current, plating efficiency, uniformity of the current density and shape of the plating area were factors that affected the deposition rate, composition and uniformity of plated magnets. The residual stress was found to limit the plated film thickness.

To characterize and condition the bath several samples were electroplated. In the initial trials, saccharin was omitted from the electroplating solution. Electroplating attempts were made with different current densities ranging from 8 $mA/cm^2$ to 18.5 $mA/cm^2$. It was found that best results were obtained at a current density of 16 $mA/cm^2$. EDS (Energy Dispersive Spectrometry) measurements showed that the resultant films consisted of 13.28% iron and 86.72% nickel. One target value for permalloy, having good magnetic properties, is 20% iron 80% nickel. Other attempts with different current densities suffered from relatively high residual stress. When the thickness reached several microns, the permalloy sheet was peeled from the sides.

Saccharin was then added to the electroplating solution and better results were obtained. The samples displayed a smooth and bright surface at all current densities. Across current density variations from of 8 $mA/cm^2$ to 17.6 $mA/cm^2$, the nickel composition varied from 82.44% to 91.65%.

A non-homogeneous surface film composition was observed by the help of EDS. The growth mechanisms induced a composition variation proportioned to deposition rate. Edge effects related to —crowding of current at the edges, introduced relatively a large variation in the composition. Bulk average film composition was also found to vary with the current density.

The average thicknesses of the permalloy films were calculated by weighting the samples before and after the deposition. The thickness can vary throughout the sample because of the edge effect. Thickness inhomogenity can reach 150% in the corners of the sample. The deposition rate is calculated from the average thickness of the sample. Iron plates more readily than nickel because of its lower reduction potential. As the current density increases the Fe composition fraction decreases because the limit current is reached for iron, but the nickel current is not yet limited by the mass transport.

The cantilever scanner substrate 1702 is also shown s a cantilever scanner 1902 with moving magnet actuator portion 1903 comprising permalloy plated over a copper seed layer on the scan plate. Similarly, the torsional scanner substrate 1704 is also shown after plating as a torsional scanner 1904 with moving magnet actuator portion 1905 comprising permalloy plated over a copper seed layer on the scan plate.

Magnetic Material Characterization

There are many different methods of measuring the magnetic properties of a material. Saturation magnetization, coercively and the residual induction are the common quantities of interest. These quantities can be obtained from the hysteresis loop (BH loop) of the material.

The vibrating sample magnetometer (VSM) is one of the standard equipment for the magnetic characterization of powder, small samples and thin magnetic films. The sample is magnetized by a dc field and it is vibrated inside of a pick-up coil, thus its flux lines cut the windings of the coil generating a voltage. By measuring this voltage the magnetization of the sample is measured. FIG. 20 Error! Reference source not found. shows the magnetic properties 2001 of electroplated permalloy found by VSM measurements.

Test Devices and Experimental Results

A number of prototype scanners were produced as described above and the experimental results were compared with the analytical and FEM results. According to an embodiment, the micro scanners were applied to bar code scanning.

Static and Dynamic Characterization

Moving magnet scanners may be actuated with an external electromagnet. Modeling of electromagnets is discussed above. In FIG. 21 a cantilever beam scanner and actuating external electromagnet are illustrated, according to an embodiment.

The produced scanners are tested with two methods:

Static deflection measurements,

Dynamic deflection measurements.

Static Deflection Measurements:

Static deflection measurements may provide information about the magnetic actuation mechanisms. The results may be compared to the theoretical calculations to obtain better models of the devices. The maximum deflection may be obtained by optimizing the 3D positioning of the electromagnet underneath the scanner.

One embodiment was a prototype device is an epoxy-glass fiber composite cantilever beam scanner. Copper was deposited as a seed layer for electroplating on both sides of the scanner. This increases the stiffness and the density of the structure. The suspension has dimensions of 1 mm×15 mm×0.26 mm and the rectangular plate has dimensions of 8 mm×8 mm×0.29 mm. The scanner was anchored from the suspension end and an electromagnet is placed under the rectangular plate that supports the magnetic material and the scan mirror. The scanner was placed such that the rectangular plate was parallel to the top surface of the electromagnet at a vertical distance of 1.5 mm. A magnetic field along the easy axis of the magnetic material was applied and removed prior to operation to induce a residual induction.

When the magnetic material (8 mm×8 mm×0.028 mm) was placed in a uniform magnetic field, it experienced only a torque. Since the rectangular plate is much wider, thicker and stiffer than the suspension one can assume it is mechanically rigid. Using equation 15, the mechanical deflection, x and the deflection angle, φ were found using equations 7, 9 and 10. In the calculations an effective Young's modulus, E of 46.5 GPa, an effective density, ρ of 3450 kg/m³, and a spring constant $k_\phi$=4.54×10⁻³ were used.

Due to thin magnetic film actuation, shape anisotropy effects are dominant and the other sources of anisotropy may be neglected. The shape anisotropy constant is calculated for the magnetic material using equation 16. The actuator had a length to thickness ratio of 285. Thus, the magnetization vector of the structure remains in the easy axis because of high shape anisotropy. The magnetic torque, $T_{field}$ is then given by equation 41.

$$T_{field} = VMH \sin(\gamma - \phi) \quad (41)$$

Where V is the volume, M is the magnetization of the magnetic material, H is the applied magnetic field, γ is the angle between the magnetic field and the easy axis of the magnetic material at rest position. and φ is the mechanical deflection angle of the structure. If one neglects φ and takes the vertical component of the magnetic field $H_z$=H sin(γ), equation 41 may be simplified to equation 42

$$T_{field} = VMH_z \quad (42)$$

The mechanical restoring torque, $T_{mech}$ is given by equation 43.

$$T_{mech} = -k_\phi \phi \quad (43)$$

At equilibrium $T_{field} + T_{mech} = 0$, and φ is given by $$\phi = \frac{T_{field}}{k_\phi} \quad (44)$$

The maximum deflection angle is less than 6 degrees and the approximation error in magnetic force calculation due to small φ assumption is less than 0.75% even at the maximum deflection. Experimental results also demonstrate that neglecting φ for the magnetic force calculation is a good approximation.

Once V, H, M and $k_\phi$ are determined, equation 43 may be solved. The magnetization may be modeled as equation 45.

$$M = \min(M_{residual} + \mu_r H_r, M_s) \quad (44)$$

where $M_{residual}$ is the residual magnetization, $\mu_r$ is the relative permeability, $H_r$ is the radial component of the magnetic field and $M_s$ is the saturation magnetization. The radial component of the magnetic field, $H_r$ magnetizes the magnetic material as it is in the direction of the easy axis. $M_{residual}$, $\mu_r$, and $M_s$ are material properties and may be found experimentally. They are taken as $M_{residual}$ =0.1T, $\mu_r$=350, and $M_s$=0.8 T in the theoretical calculations.

However, the magnetic field supplied by the electromagnet is not uniform. FIG. 13 and FIG. 14 show the experimental and FEM results for $H_z$ and $H_r$ as a function of distance from the coil centre (r=0 position) at the plane z=1.5 mm above the coil surface. The measured values of $H_z$ and $H_r$ are used in the theoretical magnetic force calculations. Average values of the $H_r$ and $H_z$ along the length of the magnetic material are used in the formulas.

Because the magnetic field is not uniform, the forces on the charges of a magnet do not cancel out, resulting in a net torque. Because the magnetic field on one pole is different than the magnetic field on the other pole, the forces they generate on the north (N) and south (S) poles are also different according to equations 46 and 47.

$$F_N = \phi H_N = MSH_N \quad (46)$$

$$F_S = \phi H_S = MSH_S \quad (47)$$

A net force given by $F_{NET} = F_N - F_S$ is generated. To account for these forces generated throughout the sample because of the changing magnetic field relative to the displacement, the magnetic material was divided into sections with positive and negative poles. The forces on the magnetic charges of the poles were calculated and the net forces resulting from their differences were also found. These forces were multiplied by the corresponding distances from the anchor to obtain the corresponding torques. Lastly the torques due to each section were added together to find the total torque and the scanner deflection using equation 42.

Soft magnetic materials are known to be attracted towards magnets or electromagnets. However, as illustrated by equations 46 and 47, in thin magnetic films, the mechanical deflection may be bidirectional (rather than omnidirectional). Due to the high shape anisotropy, the magnetization doesn't rotate and remains in-plane and the entire structure experiences a torque. The direction of the torque is determined by the direction of the magnetic flux lines and the anchor point of the structure.

FIG. 22 illustrates generally, the rotation tendencies of a shapeanisotrophy-constrained moving magnet actuator 2202a, 2202b at various locations above an electromagnetic coil 2204. As may be seen, the magnetization vector tries to align with the magnetic field lines. On the left of the electromagnet the magnetization is leftward so the scanner deflects upward and on the right the magnetization is rightward so the scanner deflects downward.

Figure 23A:
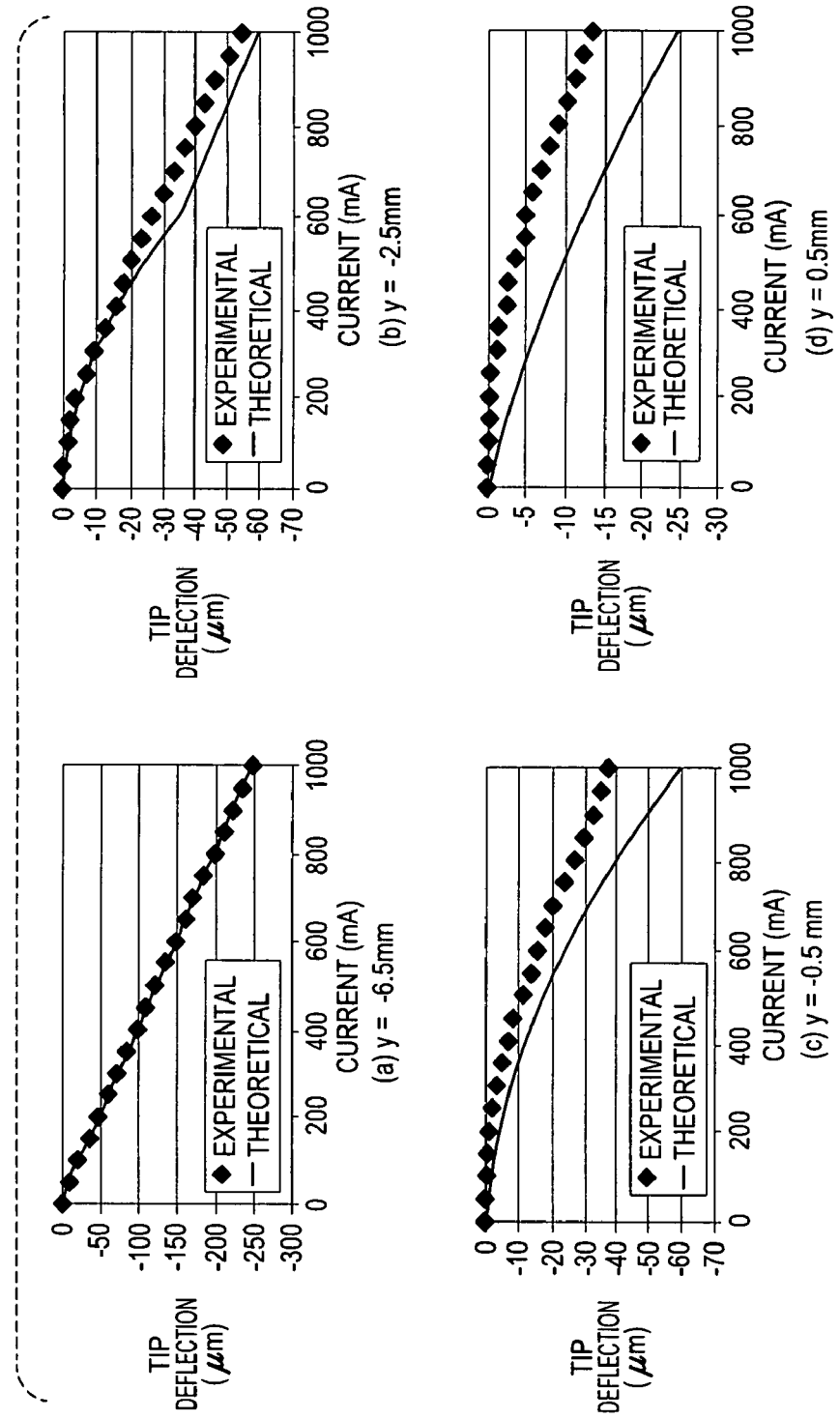
FIGS. 23A and 23B show graphically, results of theoretical and experimental tip deflections as a function of applied DC current at several radial distances, according to an embodiment.
Figure 23B:
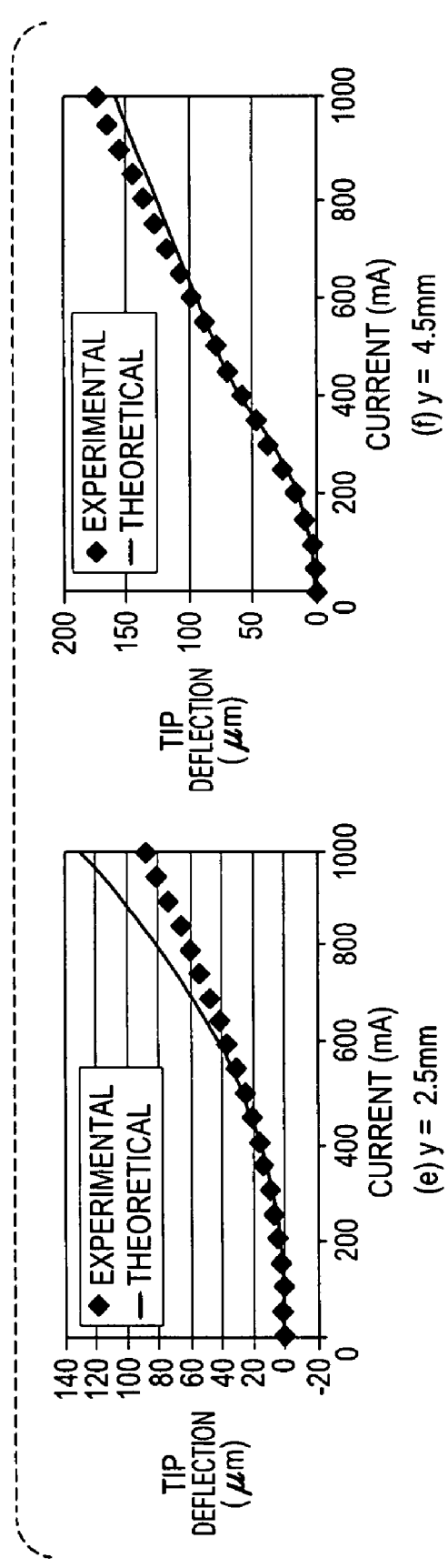
Figure 24:
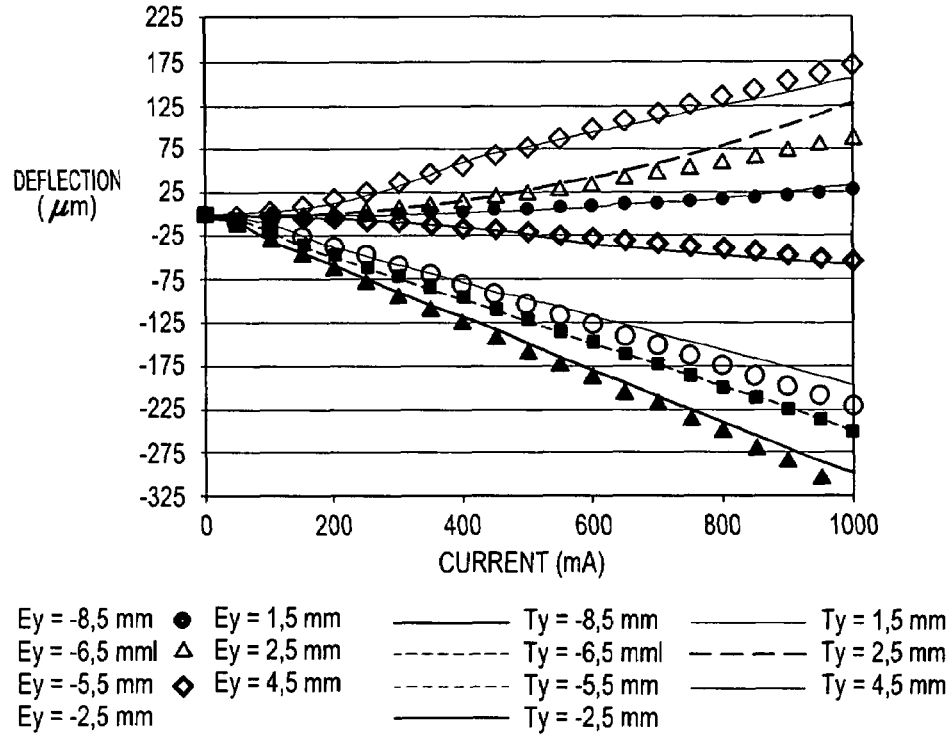
FIG. 24 shows the experimental and theoretical tip deflections of FIGS. 23A, 23B superimposed on the same plot, according to an embodiment.

FIGS. 23A and 23B shows the theoretical and the experimental tip deflections as a function of the applied DC current at different radial distances, y as separate plots. FIG. 24 shows tip deflections on the same plot. A static deflection measurement setup was used to obtain the experimental deflections.

Magnetic torque is proportional to the product of $H_z$ and M, and M increases with $H_r$ until the material is saturated. For low current values, the material is not saturated and the torque increases quadratically with current. For large current values, the material is saturated (i.e., M is constant) and the torque increases linearly with current. Where the transition from quadratic to linear relationship occurs is determined not only by the applied current but also with the relative position of the electromagnet as illustrated in FIGS. 23A and 23B. For large values of y (e.g., |y|>4.5 mm), magnetic field lines that interact with the scanner are bent away from the vertical direction and $H_r$ is larger than $H_z$, the magnetic material is saturated at lower current values and the torque current relationship is linear in the depicted current ranges. For small values of y, the radial component of the magnetic field is weaker and does not saturate the material until current is very large. Thus, the generated torque increases quadratically for small currents due to the linear increase in $H_z$ and M until M gets close to saturation. Once M is saturated, the torque increases linearly.

At larger radial distances theoretical versus experimental data is in good agreement. But close to the center of the electromagnet the error between them increases as the magnetization changes direction near the center. It is more difficult to accurately model the magnetization in this region. Changing the direction of the radial component of the magnetic field, $H_r$, changes the direction of magnetization, and so the direction of the deflection.

Figure 25:
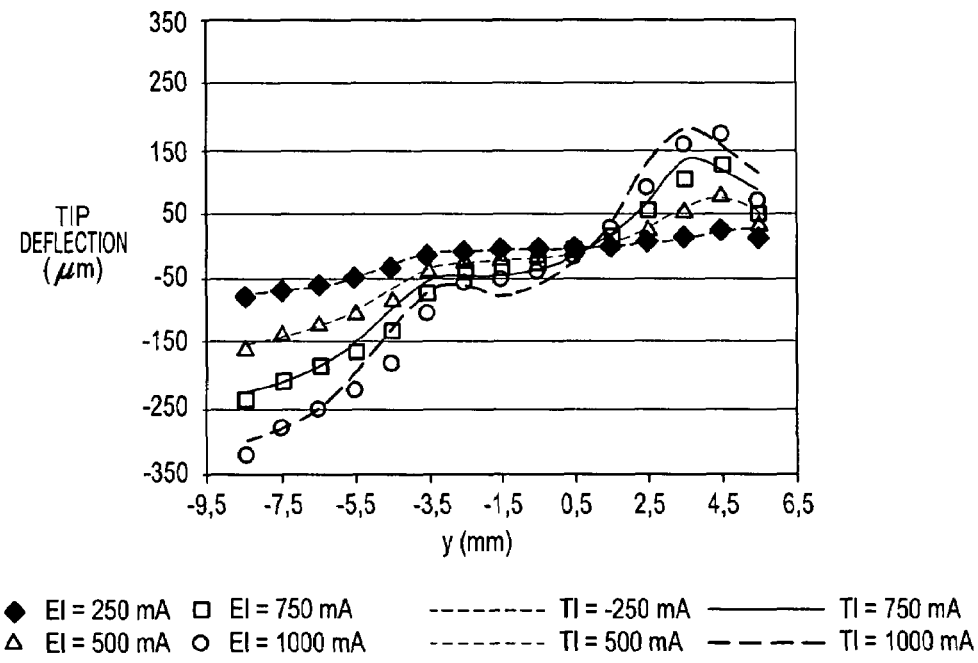
FIG. 25 is a plot of theoretical and measured tip deflections at various DC currents as a function of radial (y) distance, according to an embodiment.

FIG. 25 shows the theoretical and the experimental tip deflections at various DC currents as a function of the radial (y) distance. The maximum deflection was obtained when the coil was moved in the y<0 direction. Magnetic force along the magnetic film is a distributed force and is a function of $H_z$ along the magnetic material. As the electromagnet moves in the y<0 direction, the magnetic force gets larger towards the tip of the cantilever scanner, thereby producing a larger torque compared to moving in the other direction.

Dynamic Deflection Measurement Results

A prototype device used for dynamic deflection measurements is a polymer (RenShape SL5195) cantilever beam scanner. Polymer resin was molded and cured by UV light into the desired scanner shape. The mold defined both the flexure and the mirror dimensions. As illustrated in FIG. 21, the cantilever beam was anchored from the left and the rectangular plate at the right supported the mirror and the magnetic material. A silicon wafer coated with Aluminum was diced into square pieces and attached to the polymer plate from the top. The electroplated magnetic material (NiFe-permalloy) was attached to the bottom side of the plate. The suspension has dimensions of 1 mm×15 mm×0.5 mm and the rectangular plate has dimensions of 8 mm×8 mm×1 mm. The scanner was placed such that the rectangular plate was parallel to the top surface of the electromagnet. A magnetic field along the easy axis of the magnetic material was applied and removed prior to operation.

The deflection of the scanner is modeled using the balance between the magnetic torque $T_{field}$ and the mechanical restoring torque $T_{mech}$ as described above. The magnetic torque $T_{field}$, generated by the interaction of the permalloy sheet and the external magnetic field is given by equation 41. The deflection angle of the scanner for small deflections is given by equation 43.

The moment of inertia of the mirror is much greater than the moment of inertia of the suspension beam; therefore the bending of the mirror is negligible and is not considered. This assumption was verified with FEM simulations. Density and the Young's modulus for the material used are 1180 kg/m$^3$ and 1628 MPa, respectfully.

The magnetization of the permalloy sheet is assumed to remain along the easy axis which is in-plane because of the high shape magnetic-anisotropy. When operated in small angular displacements the out-of-plane component of the magnetic field is not sufficient to magnetize the permalloy sheet. The in-plane magnetic field component becomes more important as the magnetization M is induced by this component.

The effect of the in-plane component of the magnetic field on the magnetization hence to the angular displacement, is observed by using the same electromagnet described in 0 above.

Figure 26:
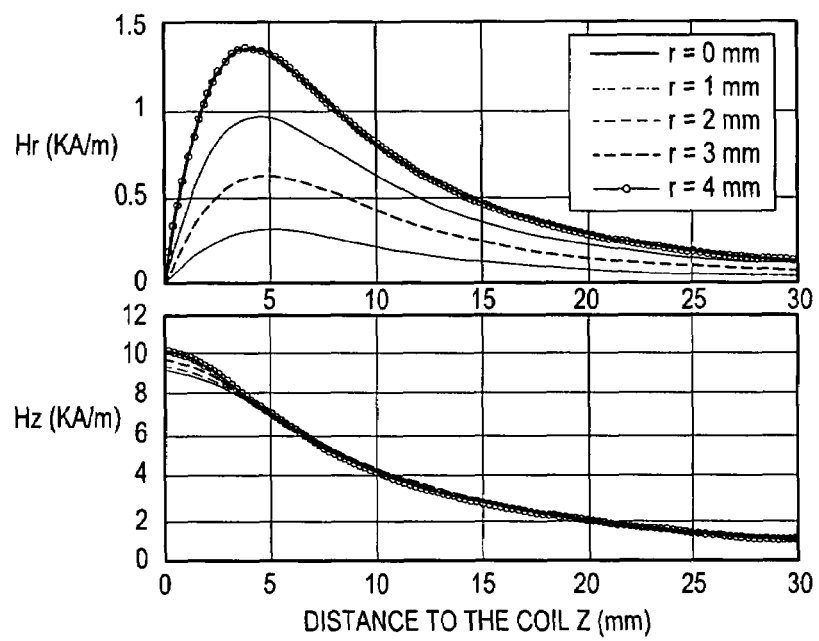
FIG. 26 is a plot of in-plane and out-of-plane components of a magnetic field, as a function of distance between an actuator coil and a permalloy sheet, according to an embodiment.
Figure 27:
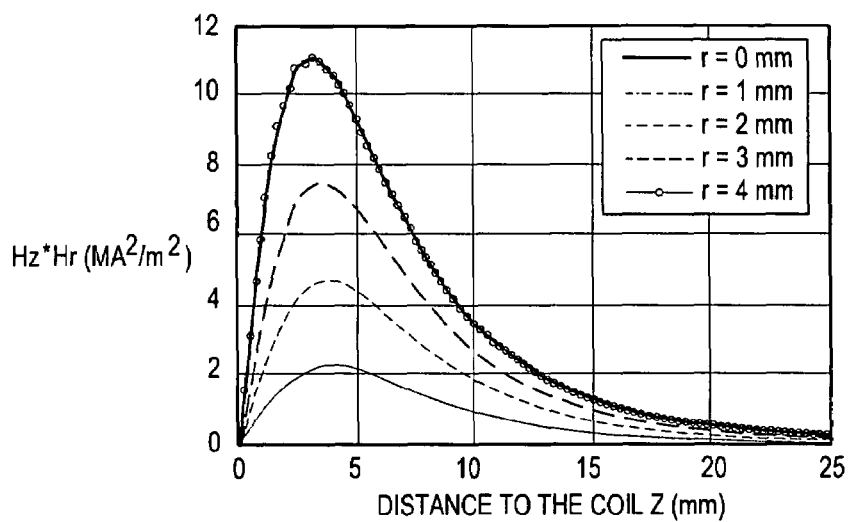
FIG. 27 is a plot of the product of in-plane and out-of-plane components of a magnetic field, as a function of distance between an actuator coil and a permalloy sheet, according to an embodiment.

The magnetic field simulations were performed using finite element modeling software (FEMLAB 3.1). FIG. 26 shows the in-plane ($H_r$) and out-of-plane ($H_z$) components of the magnetic field versus the distance between the coil and the permalloy sheet as determined by mold. FIG. 27 shows the product of $H_r$ and $H_z$ as the electromagnetic torque depends on the M·$H_z$ product and M is a nearly linear function of $H_r$. As shown in FIG. 27, a maximum torque may be achieved by placing the permalloy sheet about 3.5 mm from the coil. The product increases going away from the center axis. The coil was excited with a small biased-sinusoidal current waveform at the scanner's resonant frequency of 49 Hz.

Figure 28:
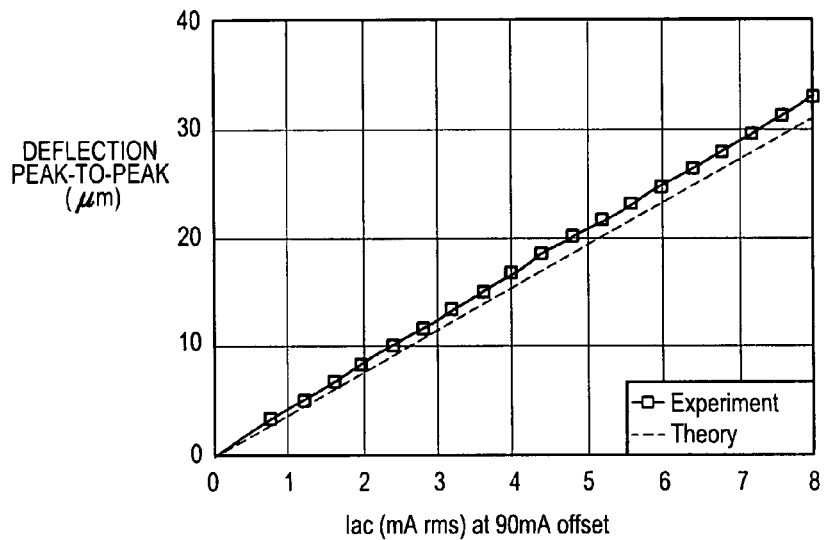
FIG. 28 is a plot of tip deflection as a function of AC drive current with a 90 mA DC offset applied to a 1200 turn coil, according to an embodiment.

The dynamic deflection of the scanner was measured using the LDV FIG. 28 shows the peak-to-peak deflection of the scanner when an ac signal on top of a dc offset is applied. Out-of-plane flux density of 3.5 mT is generated by the DC current. DC field magnetized the permalloy sheet and AC signal results in oscillation at the scanner resonant frequency. The difference between theory and experimental data at high AC currents originates from the change in magnetization, which is kept constant at its DC value in the theoretical calculations.

Figure 29:
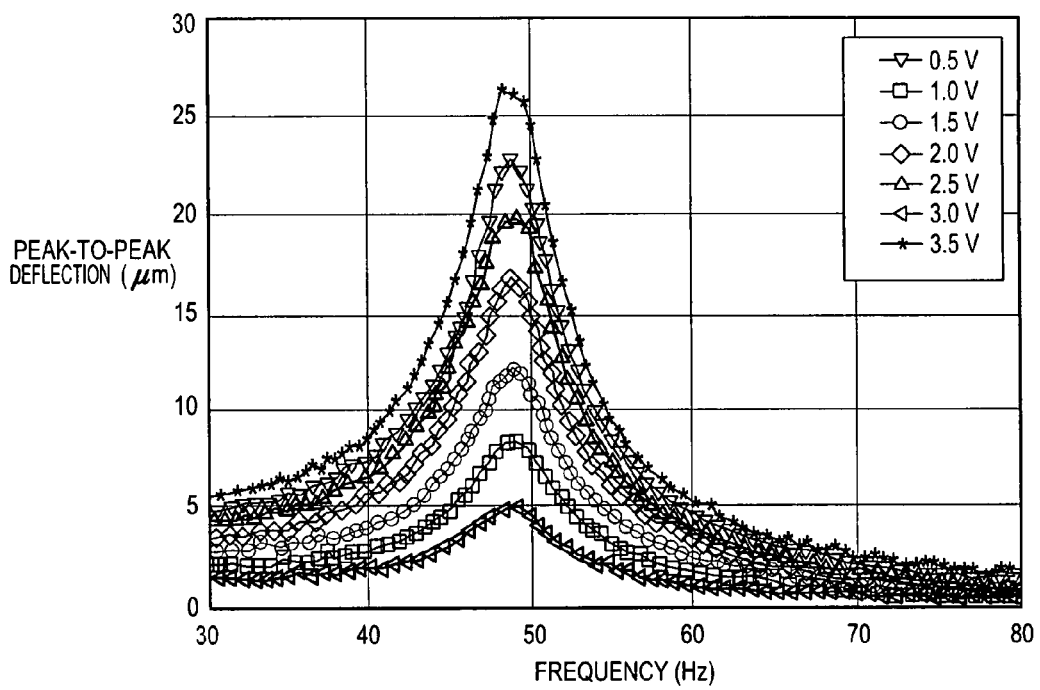
FIG. 29 is a plot of scanner resonant response as a function of DC offset voltage, according to an embodiment.
Figure 30:
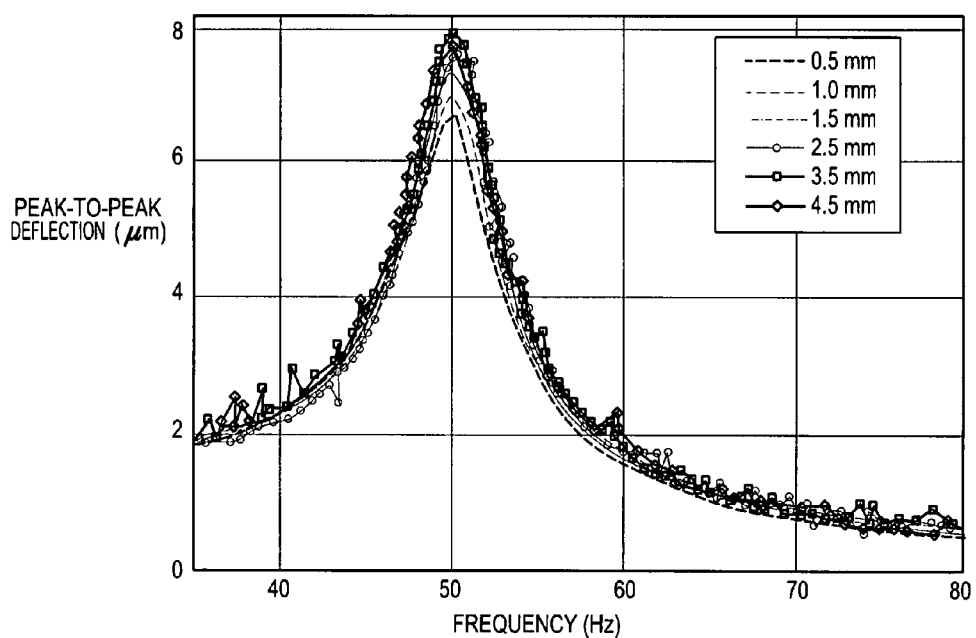
FIG. 30 is a plot of scanner resonant response as a function of distance between the scanner and the electromagnetic coil, according to an embodiment.
Figure 31:
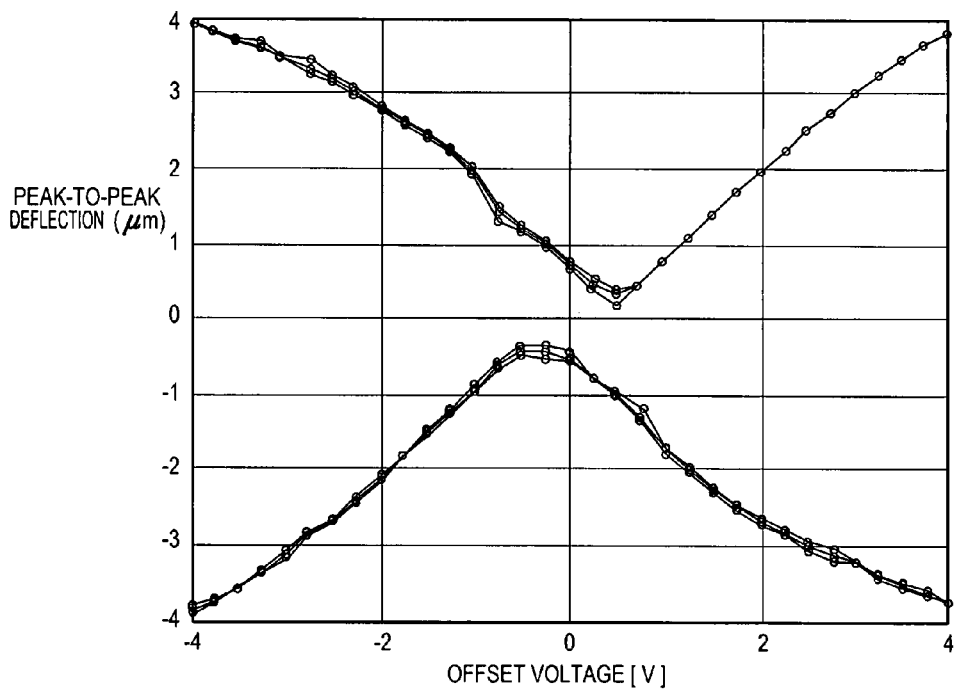
FIG. 31 is a plot of peak-to-peak scanner deflection as a function of offset voltage, according to an embodiment.

FIG. 29 shows the frequency response of the scanner for different offset values. FIG. 30 shows the frequency response of the scanner for different coil distances. As the distance is decreased, a slight spring softening effect is observed due to larger deflections.

FIG. 30 shows the peak-to-peak deflection of the scanner as a function of the offset voltage in order to show the dependency of the scanner deflection to the offset magnetic field. The deflection is plotted positive for forward sweep of the offset voltage and plotted as negative for backward sweep of the bias voltage. Nonlinearity and the hysteresis in the curve are due to the typical BH curve of the materials. The minimum AC deflection is attained at a non-zero value of the offset, which is due to the magnetization that remains on the magnetic material even when the field is zero.

Barcode Scanner System

The scanners explained in this chapter are demonstrated in a bar code reading system. A smaller coil is used to actuate the scanner and generate high in-plane and out-of-plane magnetic fields. The coil is driven with a sinusoidal signal on a DC offset at the mechanical resonance of the scanner ($f_{res}$=55 Hz) and mechanical deflections of ±7.5 degrees were observed.

Figure 32:
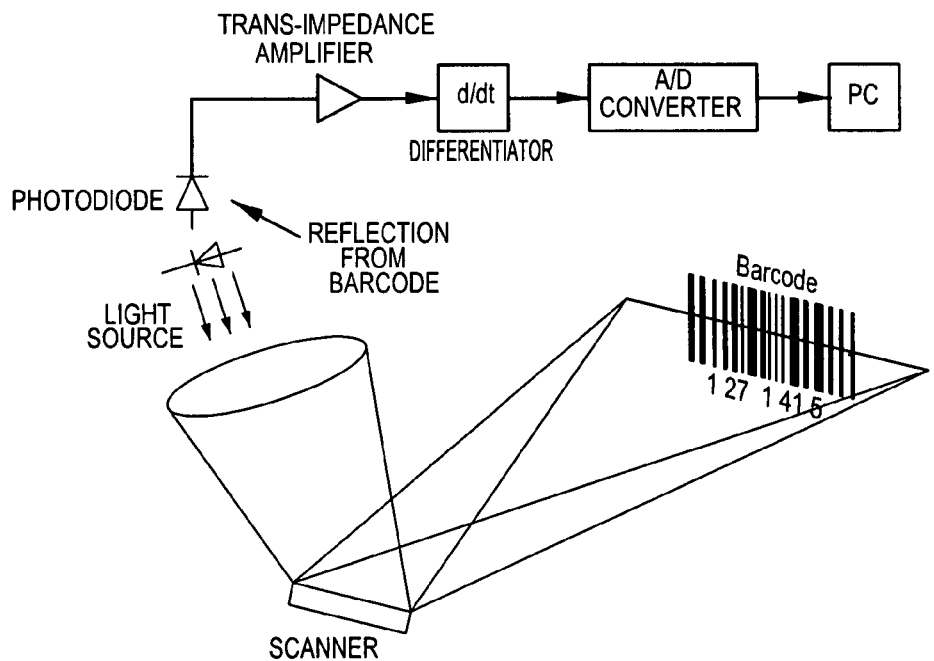
FIG. 32 is a block diagram of a bar code scanner made using a scanner disclosed herein, according to an embodiment.

The schematic representation of the system is illustrated in FIG. 32. Light from a laser diode is incident on the scanner. The light is focused and scanned over the barcode with the necessary optical elements. The scattered light is collected with a lens to the photo diode (PD) while the beam is scanned over the barcode. The output of the photo diode is processed with the necessary electronics to get the desired signal. Low resonant frequency of the scanner allowed using low-cost, widely available electronic components for data processing.

Using this test setup, various types of bar codes were read successfully. The output on the scope was filtered, then digitized and processed with a microprocessor. Different width black and white stripes in the original barcode were reconstructed using the distance between subsequent peaks in the scope signal.

2D Scanning 2D scanning of a laser spot was achieved using the scanners described herein. Both bending and torsional vibrations may be excited simultaneously by applying a dynamic field with two frequency components.

Figure 33:
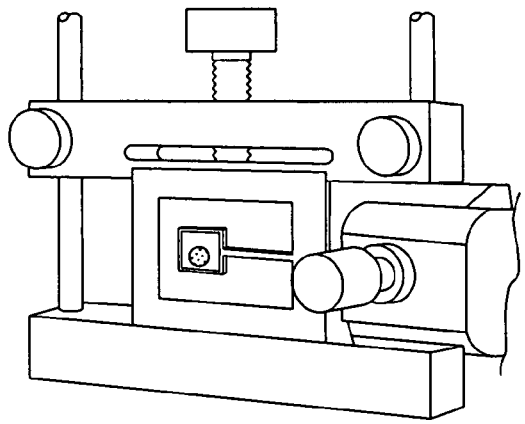
FIG. 33 is an illustration of an experimental scanner used to deflect a beam of light along two axes, according to an embodiment.
Figure 34:
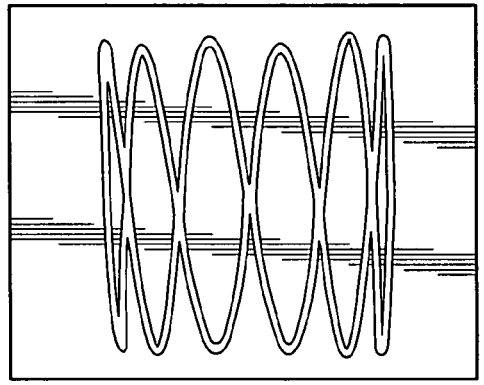
FIG. 34 is an illustration of a Luscious scan pattern formed by the scanner of FIG. 33, according to an embodiment.

An epoxy—glass fiber composite cantilever beam scanner was used to demonstrate 2D scanning. The suspension has dimensions of 1 mm×15 mm×0.19 mm and the rectangular plate has dimensions of 8 mm×8 mm×0.22 mm. By placing the scanner off-axis relative to both x and y produces a net torque around both x and y axis and excites two rotational modes at the same time. FIG. 33 shows a diagram of the scanner. FIG. 34 illustrates 2D scanning of a light spot. Mechanical deflection angles of ±6 degrees were obtained at around the resonant frequencies of 57 Hz and 338 Hz using a 7 mm mirror glued on the polymer scanner. FIG. 35 and FIG.

36 show the frequency response of the scanner around its bending and torsion modes respectively.

The preceding overview, brief description of the drawings, and detailed description describe illustrative embodiments according to the present invention in a manner intended to foster ease of understanding by reader. Other structures, methods and equivalents may be within the scope of the invention. The scope of the invention described herein shall be limited only by the claims.

What is claimed is:

1. A light beam scanner comprising:
   a mounting structure;
   an epoxy-fiberglass substrate coupled to the mounting structure and configured to oscillate in a bending motion around at least one axis of rotation;
   a first magnetic actuator portion coupled to the mounting structure; and
   a second magnetic actuator portion coupled to the epoxy-fiberglass substrate wherein the first and second magnetic actuator portions are operable to cooperate to actuate oscillation of the epoxy-fiberglass substrate;
   wherein the first magnetic actuator portion comprises a coil structure and the second magnetic actuator portion comprises a magnet comprising a soft magnetic material; and
   further comprising a copper layer coupled to the epoxy-fiberglass substrate and wherein the soft magnetic material comprises a material electroplated onto the copper layer.

2. The light beam scanner of claim 1 wherein the first magnetic actuator portion comprises the magnet and the second magnetic actuator portion comprises the coil structure.

3. The light beam scanner of claim 1 further comprising a mirror coupled to the epoxy-fiberglass substrate.

* * * * *